United States Patent [19]

Isobe et al.

[11] Patent Number: 5,670,245

[45] Date of Patent: Sep. 23, 1997

[54] MAGNETIC RECORDING MEDIUM COMPRISING A MAGNETIC LAYER CONTAINING FERROMAGNETIC METALLIC POWDER, BINDER, AND ALIPHATIC ACID

[75] Inventors: Ryosuke Isobe; Hideaki Wakamatsu, both of Hino; Akira Saitoh; Akihiko Seki, both of Saku, all of Japan

[73] Assignees: Konica Corporation; TDK Corporation, both of Japan

[21] Appl. No.: 273,188

[22] Filed: Jul. 11, 1994

[30] Foreign Application Priority Data

Jul. 13, 1993 [JP] Japan .................................. 5-173347
Nov. 9, 1993 [JP] Japan .................................. 5-303441

[51] Int. Cl.[6] ............................................. G11B 5/712
[52] U.S. Cl. ...................... 428/216; 428/328; 428/329; 428/330; 428/331; 428/336; 428/402; 428/694 BA; 428/694 BS; 428/900; 428/694 BM; 252/62.55
[58] Field of Search .................................. 428/328, 329, 428/330, 331, 336, 402, 694 BA, 694 BS, 900, 216, 694 BM; 252/62.55

[56] References Cited

U.S. PATENT DOCUMENTS

| 3,520,676 | 7/1970 | Stahr .................................. 75/0.5 |
| 4,113,528 | 9/1978 | Tokuoka et al. .................. 148/105 |
| 4,780,148 | 10/1988 | Vincent et al. .................. 106/403 |
| 5,219,670 | 6/1993 | Ohno et al. ...................... 428/694 B |
| 5,405,679 | 4/1995 | Isobe .................................. 428/212 |

*Primary Examiner*—Stevan A. Resan
*Attorney, Agent, or Firm*—Jordan B. Bierman; Bierman, Muserlian and Lucas LLP

[57] ABSTRACT

Disclosed is a magnetic recording medium which comprises a non-magnetic support and a magnetic layer formed thereon and containing at least ferromagnetic metallic powder, and the medium contains an aliphatic acid, wherein average existence ratios of elements in terms of the number of atoms forming the surface of the ferromagnetic metallic powder which is being subjected to orientation treatment in the magnetic layer, are less than 1 of sodium (Na), 40 or less of alkaline earth elements, and 1 to 50 of rare earth elements based on the number of iron (Fe) atom as 100, and the number of carbon atoms of the aliphatic acid being 12 to 24.

12 Claims, No Drawings

MAGNETIC RECORDING MEDIUM COMPRISING A MAGNETIC LAYER CONTAINING FERROMAGNETIC METALLIC POWDER, BINDER, AND ALIPHATIC ACID

BACKGROUND OF THE INVENTION

1. Field of the Invention

This invention relates to a magnetic recording medium in which high magnetic transfer characteristics possessed can be maintained without any deterioration even when it is stored or preserved under high temperature and high humidity for a long period of term.

2. Prior Art

In recent years, as a demand for a high-recording density magnetic recording medium, higher characteristics are increasingly demanded. In order to respond to these demands, it has been well known for those skilled in the art that a recording density can be improved by using a ferromagnetic metallic magnetic powder as a magnetic powder. However, it is insufficient to fulfill the requirements demanded in recent years for the high-recording density magnetic recording medium only by such a method.

Thus, as the other method, it has been carried out to make the magnetic recording medium a multi-layered structure in order to improve a reproducing output with a wide range from a high frequency to a low frequency. This is the method in which an upper layer corresponding to a high frequency and a lower layer corresponding to a low frequency are provided whereby the magnetic material responds to frequencies with a wide range to improve recording density. A technique required to the method is to make the upper layer thin.

Further, for the demand to establish higher recording density, there is a method of decreasing self-demagnetization and reproduction demagnetization by making the magnetic layer thinner. This is the method of making the upper layer a thin-film magnetic layer and the lower layer a non-magnetic layer in a plural layer structure of the magnetic recording medium. In addition to these methods, it has been proposed to improve the recording density by improving magnetic powder.

Thus, it is relatively easy to obtain a magnetic recording medium with a high recording density at a stage of before storage (or preservation). However, it is extremely difficult to maintain high magnetic transfer characteristics after storage under any conditions, particularly under high temperature and high humidity for a long time. For example, as a method for solving the problem of decrease in a reproducing output and increase in dropout after storage under high temperature and high humidity, it has been described in Japanese Provisional Patent Publication No. 146519/1992 that the content of a water-soluble calcium in magnetic powder is decreased-to 100 ppm or less. However, according to this method, a magnetic recording medium which can maintain high magnetic transfer characteristics obtained before storage even when it is stored under high temperature and high humidity cannot be obtained. Even when the above conditions are satisfied, lowering in a reproduction output and increase in dropout of a magnetic recording medium cannot sufficiently be prevented when stored under high temperature and high humidity.

Thus, the present inventors have carried out storage experiments under thinkable all the conditions to obtain a magnetic recording medium which can maintain high magnetic transfer characteristics which can be obtained before storage when it is stored at high temperature and high humidity, and is guaranteed its sufficient reliability, and have studied. As a result, they have found a phenomenon that, when a magnetic recording medium is stored under high temperature and high humidity for a long time, a reproducing output obtained before storage is markedly lowered, dropout is increased and clogging or silting of a magnetic head is generated. This phenomenon occurs when the magnetic layer of a magnetic recording medium is a single layer, but remarkably occurs in a plural layered structure. The present inventors have intensively studied the causes of this phenomenon and ascertained as follows.

In general, as a problem which is likely caused when a medium is stored under high temperature and high humidity, deterioration of magnetic powder due to oxidation of ferromagnetic metallic powder may be mentioned. The inventors have studied the above possibility but they could not obtain the result that the ferromagnetic metallic powder had been oxidized. However, it has been found that a number of projections generated on the surface of a magnetic layer when a magnetic recording medium is stored at high temperature and high humidity for a long time. They have supposed that according to these projections, a spacing loss occurs which leads to lower a reproducing output. Also, by collision of the projections and a magnetic netic head, these projections drop from the surface of the magnetic layer and dropped materials are accumulated on the head to cause silting of the head, and further drop causes frequently to increase in dropout.

Next, the present inventors have carried out analysis of portions where projections are generated. As a result, they have found that a specific substance exists at the portion where the projections are generated. The substance was a crystal of an aliphatic acid metal salt (for example, barium stearate, calcium stearate, etc.). It can be considered that, by suppressing generation of the aliphatic acid metal salt (a metal soap insoluble in water) which is specific at the portion of generating projections, a magnetic recording medium in which sufficient reliability is guaranteed and high magnetic transfer characteristics obtained before storage can be maintained can be provided.

SUMMARY OF THE INVENTION

An object of the present invention is to provide a magnetic recording medium in which high magnetic transfer characteristics obtained before storage can be maintained without causing increase in dropout, lowering in a reproducing output, silting of a head, etc., even when the medium is stored under high temperature and high humidity for a long time.

In order to remove the above problem, the present inventors have found a magnetic recording medium in which high magnetic transfer characteristics obtained before storage can be maintained even when it is stored under high temperature and high humidity for a long time by providing a magnetic layer containing a specific ferromagnetic metallic powder on a non-magnetic support and an aliphatic acid is contained, whereby accomplished the following inventions 1 to 10.

That is, the technical tasks of the present invention can be accomplished by the following constitutions.

1. A magnetic recording medium which comprises a non-magnetic support and a magnetic layer formed thereon and containing at least ferromagnetic metallic powder, and the medium contains an aliphatic acid, wherein average existence ratios of elements in terms of the number of atoms forming the surface of the ferromagnetic metallic powder which is being subjected to orientation treatment in the magnetic layer, are less than 1 of sodium (Na), 40 or less of an alkaline earth element(s), and 1 to 50 of a rare earth element (s) based on the number of iron (Fe) atom as 100, and the number of carbon atoms of the aliphatic acid being 12 to 24.

Here, as the alkaline earth elements, there may be mentioned magnesium (Mg), calcium (Ca), strontium (Sr), barium (Ba), radium (Ra), etc., and at least one element selected from the above may be contained. Also, as the rare earth elements, there may be mentioned samarium (Sm), neodymium (Nd), yttrium (Y), lanthanum (La), promethium (Pt), etc., and at least one element selected therefrom may be contained.

2. A magnetic recording medium comprising a non-magnetic support and a magnetic layer formed thereon and containing at least ferromagnetic metallic powder, and the medium contains an aliphatic acid, wherein weight ratios of elements contained in the ferromagnetic metallic powder based on the whole weight thereof are 2 to 10 parts by weight of aluminum (Al) atom, 1 to 8 parts of the rare earth elements atom, 0.1 to 5 parts by weight of the alkaline earth elements atom and less than 0.01 parts by weight of Na atom based on 100 parts by weight of Fe atom, average existence ratios of elements in terms of the number of atoms forming the surface of the ferromagnetic metallic powder are 70 to 300 of Al atom, 0.5 to 60 of rare earth elements atom, 40 or less of alkaline earth elements atom, and less than 4 of Na atom, based on the number of Fe atom as 100, and the number of carbon atoms of the aliphatic acid being 12 to 24.

3. A magnetic recording medium comprising a non-magnetic support and a magnetic layer formed thereon and containing at least ferromagnetic metallic powder, and the medium contains an aliphatic acid, wherein said ferromagnetic metallic powder releases less than 30 ppm of a metal ion of the alkaline earth elements and less than 200 ppm of a sodium ion when the powder is dipped in water and a dissolution amount of sodium is less than 300 ppm when the powder is dissolved in a hydrochloric acid solution, and the number of carbon atoms of the aliphatic acid being 12 to 24.

4. A magnetic recording medium comprising a non-magnetic support and a magnetic layer formed thereon and containing at least ferromagnetic metallic powder, and the medium contains an aliphatic acid, wherein said ferrYmagnetic metallic powder contains (1) a first element having an acid dissociation constant at free state of 8 to less than 14 and releasing a metal ion of 90 ppm or less when the powder is dipped in water and (2) a second element having the acid dissociation constant at free state of 14 or higher and releasing a metal ion of less than 200 ppm when the powder is dipped in water, and a dissolution amount of said second element is less than 300 ppm when the powder is dissolved in a hydrochloric acid solution, and the number of carbon atoms of the aliphatic acid being 12 to 24.

5. A magnetic recording medium comprising a non-magnetic support, a lower layer containing magnetic powder or non-magnetic powder formed thereon, and an upper layer formed thereon and containing ferromagnetic metallic powder, wherein said magnetic powder or non-magnetic powder releases less than 100 ppm of a sodium ion when the powder is dipped in water and a dissolution amount of sodium being less than 130 ppm when the powder is dissolved in a hydrochloric acid solution, and at least one of the lower layer and the upper layer contains an atiphatic acid having 12 to 24 carbon atoms.

6. A magnetic recording medium comprising a non-magnetic support and a magnetic layer formed thereon and containing at least ferromagnetic metallic powder, and the medium contains an aliphatic acid, wherein average existence ratios of elements in terms of the number of atoms forming the surface of the ferromagnetic metallic powder which is being subjected to orientation treatment in the magnetic layer are 1 or more of Na atom, 40 or less of alkaline earth elements atom, and 1 to 50 of rare earth elements atom, based on the number of Fe atom as 100, the number of the carbon atom of the above aliphatic acid being 12 to 24, and an amount of a free aliphatic acid in said aliphatic acid is 8.0 mg/m$^2$ or less.

7. A magnetic recording medium comprising a non-magnetic support and a magnetic layer formed thereon and containing at least ferromagnetic metallic powder, and the medium contains an aliphatic acid, wherein weight ratios of elements contained in the ferromagnetic metallic powder based on the whole weight thereof are 2 to 10 parts by weight of Al atom, 1 to 8 parts of the rare earth elements atom, 0.1 to 5 parts by weight of the alkaline earth elements atom and less than 0.1 parts by weight of Na atom based on 100 parts by weight of Fe atom, average existence ratios of elements in terms of the number of atoms forming the surface of the ferromagnetic metallic powder are 70 to 300 of Al atom, 0.5 to 60 of rare earth elements atom, 40 or less of alkaline earth elements atom, and 4 or more of Na atom, based on the number of Fe atom as 100, the number of carbon atoms of the aliphatic acid being 12 to 24, and an amount of a free aliphatic acid in said aliphatic acid is 8.0 mg/m$^2$ or less.

8. A magnetic recording medium comprising a non-magnetic support and a magnetic layer formed thereon and containing at least ferromagnetic metallic powder, and the medium contains an aliphatic acid, wherein said ferromagnetic metallic lic powder releases less than 30 ppm of a metal ion of the alkaline earth elements and 200 ppm or more of a sodium ion when the powder is dipped in water and/or a dissolution amount of sodium is 300 ppm or more when the powder is dissolved in a hydrochloric acid solution, and the number of carbon atoms of the aliphatic acid being 12 to 24, and an amount of a free aliphatic acid in said aliphatic acid is 8.0 mg/m$^2$ or less.

9. A magnetic recording medium comprising a non-magnetic support and a magnetic layer formed thereon and containing at least ferromagnetic metallic powder, and the medium contains an aliphatic acid, wherein said ferromagnetic metallic powder contains (1) a first element having an acid dissociation constant at free state of 8 to less than 14 and releasing a metal ion of 90 ppm or less when the powder is dipped in water and (2) a second element having the acid dissociation constant at free state of 14 or higher and releasing a metal ion of 200 ppm or more when the powder is dipped in water, and/or a dissolution amount of said second element is 300 ppm or more when the powder is dissolved in a hydrochloric acid solution,. and the number of carbon atoms of the aliphatic acid being 12 to 24, and an amount of a free aliphatic acid in said aliphatic acid is 8.0 mg/m$^2$ or less.

10. A magnetic recording medium comprising a non-magnetic support, a lower layer containing magnetic powder or non-magnetic powder formed thereon, and an upper layer formed thereon and containing ferromagnetic metallic powder, wherein said magnetic powder or non-magnetic powder releases 100 ppm or more of a sodium ion when the powder is dipped in water and/or a dissolution amount of sodium being 130 ppm or more when the powder is dissolved in a hydrochloric acid solution, and at least one of the lower layer and the upper layer contains an aliphatic acid having 12 to 24 carbon atoms, and an amount of a free aliphatic acid in said aliphatic acid is 8.0 mg/m² or less.

As a preferred embodiment of the present invention, the magnetic recording medium preferably has at least one subbing layer between the above non-magnetic support and the above magnetic layer, and the dry film thickness of the magnetic layer is preferably 0.02 to 1.0 μm, more preferably 0.1 to 0.6 μm. When the magnetic layer is provided with a plural number of layers, the dry film thickness of the lower layer is preferably 0.2 to 2.0 μm, more preferably 0.3 to 1.5 μm.

Also, in the above 1 to 4 and 6 to 9, the above magnetic powder or the non-magnetic powder contained in the above lower layer preferably releases a sodium ion released from the magnetic powder or the non-magnetic powder when the powder is dipped in water of less than 130 ppm.

In a further preferred embodiment of the present invention, the above magnetic powder or the non-magnetic powder contained in the above lower layer preferably has a needle shape. Also, the aliphatic acid having 12 to 24 carbon atoms is preferably contained in the lower layer.

PREFERRED EMBODIMENTS OF THE INVENTION

The present inventors have found that projections occurred on the surface of the magnetic layer when a magnetic recording medium is stored under high temperature and high humidity for a long time and have found that these projections and magnetic transfer characteristics of the high recording density magnetic recording medium are correlated mutually. As a result of the investigation about the conditions under which these projections generate, and they have found that the projections generate when the following three conditions are all satisfied.

The first condition is an existence state of an aliphatic acid in layers of a non-magnetic support, the second condition is characteristics of a ferromagnetic metallic powder contained in the magnetic layer or characteristics of the ferromagnetic powder contained in the magnetic layer and those of the magnetic powder or non-magnetic powder contained in the lower layer (or subbing layer), and the third condition is stored under high temperature and high humidity (40° to 60° C./70 to 90% RH (relative humidity)).

That is, generation of projections can be prevented when one of the above three conditions is removed. However, the third condition mentioned above is a stored condition so that we cannot control it by the magnetic recording medium. Thus, the inventors have established the present invention by controlling the first two conditions so that a magnetic recording medium which can maintain high magnetic transfer characteristics inherently possessed before storing even when the medium is stored under high temperature and high humidity for a long time.

It is uncertain that the mechanism of generating the projections, jections, but the following reactions can be expected.

a. A sodium ion contained in a magnetic powder or non-magnetic powder of a magnetic recording medium dissolves in water which was attached to the medium under high temperature and high humidity.

b. A free aliphatic acid is dissolved in water which was attached to the medium under high temperature and high humidity.

c. The aliphatic acid and the sodium ion dissolved in water react.

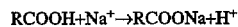

wherein RCOOH is stearic acid, palmitic acid, myristic acid, etc.; and RCOONa shows good solubility in water.

d. Due to H⁺ of above c, a calcium ion, a barium ion, etc. are dissolved out from the magnetic powder or non-magnetic powder in the magnetic recording medium.

e. RCOONa and the calcium ion, barium ion, etc. dissolved in water react.

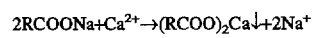

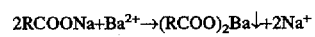

In the above reactions, when the metal ion ($Ca^{2+}$, $Ba^{2+}$, etc.) is an element which forms a water-insoluble metal soap, similar reactions occur.

f. Since $(RCOO)_2Ca$ and $(RCOO)_2Ba$ are insoluble in water, they are crystallized which becomes a cause of generating projections.

The above reactions are one of the methods for industrially preparing a metal soap. The usual methods for preparing a metal soap can be roughly classified into two methods of ① a methathesis method (a water-solvent system, an alcohol-solvent system), and ② a direct method (a melt method, a semi-melt method, a slurry method, a solid phase method and a solvent method).

① Characteristics of the methathesis method

The reaction rate is rapid and the reaction easily proceeds at a low temperature.

Since a metal soap is generally water-insoluble, by mixing an alkali soap (water-soluble) and an aqueous solution of a metal salt, the reaction instantaneously completes and the formed metal soap immediately precipitates.

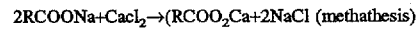

② Characteristics of the direct method

The reaction rate is slow and the reaction temperature is high.

By maintaining the temperature of the mixture comprising an aliphatic acid, an oxide and a hydroxide of a metal to higher than the melting point of the formed metal soap, and evaporating water formed by the reaction out of the reaction system, the reaction proceeds.

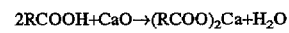

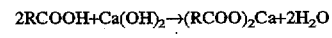

In the reaction according to the above ② direct method, it should be carried out at a temperature not lower than the melting point of the metal soap to be formed (for example, in the case of calcium stearate, the melting point is about 150° C.) so that the conditions are markedly different from the high temperature and high humidity as referred to in the present invention. Thus, it cannot be considered that the reaction of the direct method occurs when the magnetic recording medium is stored.

Thus, the reactions occurred in the stored conditions would be those in the methathesis method. As clearly seen from the reaction, characteristic feature of this reaction resides in that the reaction indirectly occurs not by the direct reaction between the aliphatic acid and an element which forms a water-insoluble metal soap such as calcium and barium, etc.

For inhibiting generation of the projections, if the reactions a and b as mentioned above are inhibited, the reaction c is also inhibited whereby the reaction thereafter would hardly occur. Thus, to inhibit the reactions a and b would result to inhibit occurrence of projections. The resolution methods are shown below.

To inhibit dissolution of a sodium ion into water.

To inhibit dissolution of an aliphatic acid into water.

To inhibit dissolution of an element which forms water-insoluble metal soap such as calcium, barium, etc.

According to the above three resolution measures, generation of projections can be inhibited and a magnetic recording medium which maintains high magnetic transfer characacteristics can be obtained after storage.

In order to inhibit dissolution of a sodium ion into water, a dissolution amount of the sodium ion is controlled by controlling an average existence ratio of an element existing on the surface of the ferromagnetic metal powder which are subjected to orientation treatment to the magnetic layer. Also, in order to inhibit dissolution of an element which forms a water-insoluble metal soap such as calcium, barium, etc., dissolution amounts of the sodium ion and the alkaline earth elements are controlled by controlling the whole composition and the surface state of the ferromagnetic metallic powder.

The average existence ratio of element(s) forming the surface of the ferromagnetic metallic powder which are present in the oriented and dried magnetic coating film of the present invention can be measured by using a XPS surface analyzer.

Next, the method is explained. The XPS surface analyzer was set under the conditions as mentioned below. X-ray anode; Mg Resolution; 1.5 to 1.7 eV (The resolution was regulated by a half-value width of a clean Ag3d5/2 peak).

The XPS surface analyzer is not specifically limited and any devices may be used, but in the present invention, ESCALAB-200R (trade name) manufactured by VG Co. was used.

Narrow scan was carried out in the measurement range as mentioned below to measure respective spectra of each element. At this time, an intake span of the data was set 0.2 eV, and it was necessary to integrate the desired peak until a count not less than the minimum count which can be detected as shown below can be obtained.

| Peak | Measured range (Binding energy eV) | Minimum detection intensity (count) |
|---|---|---|
| C1s | 305 to 280 | Optional |
| Fe2p3/2 | 730 to 700 | 600,000 |
| Na(KL$_{23}$L$_{23}$) | 280 to 250 | 600,000 |

Auger peak

The obtained spectra were corrected their energy positions so as to become the C1s peak position to 284.6 eV.

Next, to effect a processing on COMMON DATA PROCESSING SYSTEM Vet. 2.3 (hereinafter abbreviated to "VANAS soft") prepared by VAMAS-SCA-JAPAN, the above spectra were transferred to a computer which is capable of using the VAMAS soft by using a soft provided by respective manufacturers of a device. Then, after converting the transferred spectra to a VAMAS format by using the VAMAS soft, processing of data was carried out.

Before effecting quantitative processing, calibration of Count Scale was carried out for respective elements and five points smoothing treatment was carried out. By making the peak positions of the respective elements center portions, peak area intensities (cps * eV) were obtained with the quantitative range as shown in the following table. By using the sensitivity coefficients shown below, atom number %'s of the respective elements were calculated. The number of atoms was calculated based on 100 atoms of Fe and was made a quantitative value.

| Element | Peak position (B.E.: eV) | Quantitative range (B.E.: eV) | Sensitivity coefficient |
|---|---|---|---|
| Fe | at about 719.8 | High B.E. side: 5 eV Low B.E. side: 7 eV | 10.54 |
| Na | at about 264.0 | High B.E. side: 2 eV, Minimal value around there Low B.E. side: 6 eV | 7.99 |

Except for the above elements, they were measured according to the following conditions.

TABLE 1

<Measurement conditions of surface composition of ferromagnetic metallic powder in the magnetic layer>

| Element | Measured range (B.E.) | Minimum count number | Quantitative range (values from the peak position) | Sensitivity coefficient |
|---|---|---|---|---|
| Nd | 244–220 | 50,000 | High B.E. Side: 6 eV Low B.E. Side: 6 eV | 2.710 |
| Y | 172–152 | 100,000 | High B.E. Side: 6 eV Low B.E. Side: 5 eV | 6.240 |
| La | 854–830 | 1,000,000 | High B.E. Side: 9 eV Low B.E. Side: 6 eV | 26.490 |
| Si | 165–145 | 60,000 | High B.E. Side: 5 eV Low B.E. Side: 6 eV | 0.855 |
| Al | 88–68 | 50,000 | High B.E. Side: 4 eV Low B.E. Side: 4 eV | 0.570 |
| Ca | 366–342 | 100,000 | High B.E. Side: 10 eV Low B.E. Side: 5 eV | 5.130 |
| Ba | 808–790 | 1,000,000 | High B.E. Side: 5 eV Low B.E. Side: 5 eV | 17.040 |
| Sr | 150–130 | 300,000 | High B.E. Side: 5 eV Low B.E. Side: 4 eV | 5.290 |

<Method for preparing samples>

Before effecting the above measurements, a pre-treatment of a medium (magnetic tape) was carried out.

A binder resin was removed from a magnetic tape by a plasma low temperature ashing treatment method to expose magnetic particles. As to the conditions of the processing method, those in which the binder resin is ashed but the magnetic particles are not damaged are selected. For example, after processing with the device and processing conditions as mentioned below, average existence ratios of elements forming the surface of the ferromagnetic metallic powder, to which orientation treatment of the powder was carried out, were measured.

Device: PL-850X (Trade name) manufactured by Meiwa Shoji Co.

Processing conditions: FORWARD POWER 100 W
REFLECTED POWER 5 W
Vacuum degree 10 Pa
Kind of introduced gas Air
Discharged time 1 min Also, weight ratios of elements based on the whole amount of the ferromagnetic metallic powder of the present invention were obtained by using a wavelength dispersion type fluorescent X-ray analyzer (WDX), after measuring a fluorescent X-ray intensity of respective elements, and effecting a calculation according to the fundamental parameter method (hereinafter abbreviated to as "FP method").

For measurement of the fluorescent X-ray, WDX system 3080 (trade name) manufactured by Rigaku Denki Co. was used under the following conditions.

X-ray tube: Rhodium tube Output: 50 KV, 50 mA Spectral crystal: LiF (with regard to Fe, Co, Ni, Nd, La, Y, Sr, Ca and Ba), PET (with regard to Al), RX-4 (with regard to Si) and RX-40 (with regard to Na) Absorber/Al: 1/1 (with regard to Fe: 1/10) Slit: COARSE Filter: OUT PHA: 15 to 30 (with regard to Al, Si and Na), 10 to 30 (with regard to Fe, Co, Ni, Nd, La, Y, St, Ca and Ba) Count time: peak=40 sec, background=40 sec (two points before and after peak were measured)

For effecting the measurement by fluorescent X-ray, the devices to be used are not limited by the device as mentioned above and various devices may be used.

As the standard samples, the following eight metal compounds were used.

Standard sample 1 is an alloy SRM 1219 (containing 0o15 % by weight of C, 0.42% by weight of Mn, 0.03% by weight of P, 0.55% by weight of Si, 0.16% by weight of Cu, 2.16% by weight of Ni, 15.64% by weight of Cr, b.16% by weight of Mo and 0.06% by weight of V, respectively) produced by Analytical Reference Materials International Co.

Standard sample 2 is an alloy SRM 1250 (containing 37.78% by weight of Ni, 0.08% by weight of Cr, 0.01% by weight of Mo, 16.10% by weight of Co and 0.99% by weight of Al, respectively) produced by Analytical Reference Materials International Co.

Standard sample 3 is magnetic iron oxide powder (containing 0.14% by weight of Mn, 0.15% by weight of P, 0.19% by weight of S, 0.36% by weight of Si, 3.19% by weight of Co, 1.26% by weight of Zn, 0.07% by weight of Ca and 0.02% by weight of Na, respectively).

Standard sample 4 is ferromagnetic metallic powder (containing 2.73 % by weight of Nd and 0.001% by weight of Na).

Standard sample 5 is ferromagnetic metallic powder (containing 0.97% by weight of Sr).

Standard sample 6 is ferromagnetic metallic powder (containing 1.40% by weight of Ba and 0.40% by weight of Ca).

Standard sample 7 is ferromagnetic metallic powder (containing 2.69% by weight of La).

Standard sample 8 is ferromagnetic metallic powder (containing 1.98% by weight of Y).

The values of % by weights of elements in the above Standard samples 1 and 2 are values in the data sheet offered by the manufacturer, and those of the above Standard samples 3 to 8 are analytical values measured by an ICP fluorescent analyzer. The values are input as a compositional value of elements in Standard samples in the following calculations by the FP method. For calculation of the FP method, Fundamental Parameter Software Version 2.1 prepared by TECHNOS Co. was used and calculation was carried out by the following conditions.

Sample model: Bulk sample Balance component sample: Fe input component: Measured X-ray intensity (KCPS) Analysis unit: % by weight Weight ratios of respective elements calculated were converted as % by weight of other elements based on 100% by weight of Fe to make the values quantitative values.

Further, average existence ratio of compositional elements at the surface of the ferromagnetic metallic powder can be obtained by the method as mentioned below.

As for the average existence ratio of respective elements, Fe, Co, Ni, Nd, Si, Al, Sr, Ca, Ba, Y, Na and La in the composition at the surface of the ferromagnetic metallic powder, these values were obtained by using the XPS surface analyzer.

In the following, the method is explained.

First, the XPS surface analyzer was set at the following conditions.

X-ray anode; Mg Resolution; 1.5 to 1.7 eV (The resolution was regulated by a half-value width of a clean Ag 3d5/2 peak).

For fixing the sample, the so-called adhesive tape was not used. The kind of the XPS surface analyzer is not specifically limited and various devices may be used, but in the present invention, ESCALAB-200R (trade name) manufactured by VG Co. was used.

Narrow scan was carried out in the measurement range as mentioned below to measure respective spectra of each element. At this time, an intake span of the data was set 0.2 eV, and the desired peak was integrated until a count not less than the minimum count shown in Table 2 was obtained.

The obtained spectra were corrected their energy positions so as to become the C peak position to 284.6 eV.

Next, to effect a processing on COMMON DATA PROCESSING SYSTEM Vet. 2.3 (hereinafter abbreviated to "VAMAS soft") prepared by VAMAS-SCA-JAPAN, the above spectra were transferred to a computer which is capable of using the VAMAS soft by using a soft provided by respective manufacturers of a device.

Then, after converting the transferred spectra to a VAMAS format by using the VAMA$ soft, processing of data was carried out. Before effecting quantitative processing, calibration of Count Scale was carried out for respective elements and five points smoothing treatment was carried out.

The quantitative processig is as follows. By making the peak positions of the respective elements center portions, peak area intensities were obtained with the quantitative range as shown in the following table. By using the sensitivity coefficients shown in the following table, atom number %'s of the respective elements were calculated. The number of atoms was calculated based on 100 atoms of Fe and was made a quantitative value.

TABLE 2

<Measurement conditions of surface composition of ferromagnetic metallic powder in the magnetic layer>

| Element | Measured range (B.E.) | Minimum count number | Quantitative range (values from the peak position) | Sensitivity coefficient |
|---|---|---|---|---|
| Fe | 725–700 | 1,000,000 | High B.E. Side: 7 eV Low B.E. Side: 6 eV | 10.540 |
| Co | 800–770 | 1,000,000 | High B.E. Side: 12 eV Low B.E. Side: 8 eV | 12.200 |
| Ni | 875–845 | 300,000 | High B.E. Side: 15 eV Low B.E. Side: 6 eV | 13.920 |

TABLE 2-continued

<Measurement conditions of surface composition of ferromagnetic metallic powder in the magnetic layer>

| Element | Measured range (B.E.) | Minimum count number | Quantitative range (values from the peak position) | Sensitivity coefficient |
|---|---|---|---|---|
| Nd | 244–220 | 50,000 | High B.E. Side: 6 eV<br>Low B.E. Side: 6 eV | 2.710 |
| Y | 172–152 | 100,000 | High B.E. Side: 6 eV<br>Low B.E. Side: 5 eV | 6.240 |
| La | 854–830 | 1,000,000 | High B.E. Side: 9 eV<br>Low B.E. Side: 6 eV | 26.490 |
| Si | 165–145 | 60,000 | High B.E. Side: 5 eV<br>Low B.E. Side: 6 eV | 0.855 |
| Al | 88–68 | 50,000 | High B.E. Side: 4 eV<br>Low B.E. Side: 4 eV | 0.570 |
| Ca | 366–342 | 100,000 | High B.E. Side: 10 eV<br>Low B.E. Side: 5 eV | 5.130 |
| Ba | 808–790 | 1,000,000 | High B.E. Side: 5 eV<br>Low B.E. Side: 5 eV | 17.040 |
| Sr | 150–130 | 300,000 | High B.E. Side: 5 eV<br>Low B.E. Side: 4 eV | 5.290 |
| Na | 1088–1060 | 1,500,000 | High B.E. Side: 4 eV<br>Low B.E. Side: 5 eV | 7.990 |

As the method for inhibiting dissolution of a sodium ion into water of the present invention, there is a method of controlling amounts of a metal ion of an alkaline earth element or a sodium ion which are liberated from ferromagnetic metallic powder when the ferromagnetic metallic powder is dipped in water and of sodium to be dissolved in a hydrochloric acid solution. These amounts of a metal ion of an alkaline earth element or a sodium ion which are liberated from ferromagnetic metallic powder when the ferromagnetic metallic powder is dipped in water and of sodium to be dissolved in a hydrochloric acid solution are measured by the boiling method as mentioned below.

① The sample was pulverized in a mortar.

② 5.00 g of the pulverized sample was weighed by a balance.

③ The weighed sample was placed in a 200 ml beaker made of Teflon (trade name).

④ 100 ml of pure water was added to the beaker with the use of a whole pipette.

⑤ The beaker was placed on a thermostat with a temperature controller and the mixture was boiled for 5 minutes.

⑥ The mixture was cooled to around 20° C. with a tap water.

⑦ The mixture was filtered through a No. 5C filter paper using a funnel and received in a 100 ml volumetric flask (the filter paper to be used should be used by washing with pure water well before use).

⑧ 10 ml of the filtrate was taken out with a whole pipette and diluted so as to become within the measurable concentration range (0 to 5 ppm) (e.g., 5-fold→50 ml, 10-fold→100 ml, 20-fold→200 ml).

⑨ The diluted solution was measured by using an atomic absorption spectro photometer with respect to each element.

At this time, the extraction method by adding a hydrochloric acid solution is the same as mentioned above except for adding 2 ml of 0.24 N-HCl in addition to pure water in the above step ④.

The amount can be obtained by substituting the resulting measured value in the formula: measured value (ppm)× dilution fold×100÷5.

Also, by controlling the amount of a metal ion released from a element(s) having a specific acid dissociation constant contained in the ferromagnetic metallic powder at free state and the dissolution amount of said element in the hydrochloric acid solution, the problems to be solved by the invention can be solved. That is, even when a dissolution amount in an aqueous solution of an element having the acid dissociation constant as a metal ion of 8 to less than 14 is small, if a dissolution amount of an element having the acid dissociation constant as a metal of 14 or more is much, protons are formed by the aforesaid reaction c and the aforesaid reaction d is promoted whereby the element having the acid dissociation constant as a metal ion of 8 to less than 14 is dissolved to form a metal soap insoluble in water by the reaction with an alkali soap, which becomes a cause of generating projections. In such a case, it is necessary to suppress the aforesaid reaction a.

Thus, by controlling amounts of an element having the acid dissociation constant as a metal ion of 8 to less than 14 and an element having the acid dissociation constant as a metal of 14 or more to specific amounts, dispersibility and stability of a paint are improved whereby excellent magnetic transfer characteristics can be obtained.

As the element having the acid dissociation constant as a metal ion of 8 to less than 14, there may be preferably mentioned $Tl^+$, $Ni^{2+}$, $Co^{2+}$, $Mn^{2+}$, $Ba^{2+}$, $Ca^{2+}$, $Sr^{2+}$, $Mg^{2+}$, $Nd^{3+}$, $Pr^{3+}$, $Ce^{3+}$, $La^{3+}$, and $Y^{3+}$, more preferably elements of $Ba^{2+}$, $Ca^{2+}$, $Sr^{2+}$, $Nd^{3+}$, $La^{3+}$, and $Y^{3+}$.

Also, as the element having the acid dissociation constant as a metal of 14 or more, there may be mentioned $Na^+$, $Li^+$, $K^+$, $Rb^+$, and $Cs^+$.

In the magnetic metallic powder of the present invention, an iron oxyhydroxide obtained by blowing an oxidative gas into an aqueous suspension in which a ferrous salt and an alkali are mixed is used as a starting material. As a kind of the iron oxyhydroxide, α-FeOOH is preferred, and as a preparation method thereof, there may be mentioned a first method in which a ferrous salt is neutralized with an alkaline hydroxide to prepare an aqueous suspension of $Fe(OH)_2$, and an oxidative gas is blown into the suspension to obtain needle-shaped α-FeOOH. Also, there may be mentioned a second method in which a ferrous salt is neutralized with an alkaline carbonate to prepare an aqueous suspension of $FeCO_3$, and an oxidative gas is blown into the suspension to obtain sprindle-shaped α-FeOOH.

As the iron oxyhydroxide, preferred is an iron oxyhydroxide obtained by reacting a ferrous salt aqueous solution and an alkaline aqueous solution to obtain an aqueous solution containing ferrous hydroxide and oxidizing the aqueous solution with air oxidation or the like. In the ferrous salt aqueous solution, a salt of an alkaline earth element such as a Ni salt, a Ca salt, a Ba salt, a Sr salt, etc., a Cr salt, a Zn salt, etc. may coexist, and by selecting and using such a salt suitably, a particle shape (axial ratio), etc. can be desirably controlled.

The ferrous salt is preferably ferrous chloride, ferrous sulfate, etc.

The alkali is preferably NaOH, $NH_4OH$, $(NH_4)_2CO_3$, $Na_2CO_3$, etc. The Ni salt is preferably nickel chloride, etc., and the salts of Ca, Ba, Sr, etc., preferably include chlorides such as calcium chloride, barium chloride, strontium chloride, chromium chloride, zinc chloride, etc., respectively.

By using a slurry obtained by using the above iron oxyhydroxide as a starting material, the following procedures are carried out.

In the present invention, when Co is to be introduced, introduction of Co is carried out before introducing Al and/or Si and a rare earth element as described above and it is specifically carried out by using a Co compound such as cobalt sulfate, cobalt chloride, etc. and mixing an aqueous solution thereof with a slurry of the above iron oxyhydroxide by stirring.

Next, Al and/or Si is/are introduced as described below.

That is, Al and/or Si may be introduced preferably by preparing a slurry of an iron oxyhydroxide containing Co, then adding an aqueous solution containing a Al compound and/or a Si compound and an aqueous solution containing a compound of a rare earth element to the slurry, respectively and stirring the resulting mixture.

The concentration of the aqueous solution containing a Al compound and/or a Si compound may be 0.5 to 1.5 M. The aqueous solution may contain only one of a Al compound and a Si compound. When both of Al and Si compounds are contained, the total amount of them may be in the above range.

As the Al compound to be used, there may be mentioned sodium aluminate, sodium metaaluminate, etc. and as the Si compound, there may be mentioned sodium silicate, etc. As the rare earth element which is preferably introduced in the present invention, there may be mentioned Nd, Sm, Pr, La, Y, etc.

As the compound of the rare earth element to be used for preparing the above aqueous solution, there may be mentioned a chloride such as neodymium chloride, samarium chloride, praseodymium chloride, lanthanum chloride, yttrium chloride, etc., a nitrate such as neodymium nitrate, praseodymium nitrate, etc. and others. Further, two or more of the rare earth elements may be used in combination.

In the present invention, as described above, it is preferred to prepare and add the aqueous solution containing Al and/or Si and the aqueous solution containing the rare earth element separately. However, an aqueous solution containing Al and/or Si and the rare earth element may be prepared and added depending on the case.

Further, in the embodiment of preparing and adding the above aqueous solutions separately, both solutions may be added simultaneously, or after adding one of the solutions, the other of them may be added. In the latter case, it is preferred to firstly add the aqueous solution containing Al and/or Si and thereafter add the aqueous solution containing the rare earth element.

In the present invention, the iron oxyhydroxide containing the alkaline earth element, Al and/or Si and the rare earth element and further preferably Co is obtained as described above.

The thus prepared iron oxyhydroxide is washed with water sufficiently, dried and then subjected to heat treatment under non-reductive atmosphere at a temperature of 300° to 800° C. If the heat treatment temperature is lower than 300° C., the number of pores formed in $\alpha$-$Fe_2O_3$ particles by dehydration of $\alpha$-FeOOH are increased, whereby characteristics of the magnetic metallic powder after reduction are worsened. If the heat treatment temperature is higher than 800° C., melting of $\alpha$-$Fe_2O_3$ particles starts to change a shape of the particles, or sintering proceeds, whereby characteristics of the resulting magnetic metallic powder are worsened. Next, the magnetic metallic powder after the heat treatment is reduced under hydrogen gas stream at a temperature of 300° to 600° C., and an oxidized film is formed on the surface of the particles according to the known method to obtain a magnetic metallic powder.

The amount of Na of the ferromagnetic metallic powder can be adjusted to the amount described in the above 1. to 4. by washing the powder with water before the heat treatment under non-reductive atmosphere, after the heat treatment or after formation of the oxidized film.

Further, by controlling not only the ferromagnetic metallic powder but also the dissolution amount of a sodium ion of the magnetic powder or non-magnetic powder contained in the subbing layer, dissolution of an element(s) to an aqueous solution, which forms a metal soap insoluble in water, can be prevented when the ferromagnetic metallic powder, the magnetic powder or the non-magnetic powder contained in the subbing layer is dipped in water.

In the present invention, it is also possible to prevent occurrence of crystals of an aliphatic acid metal salt which is a cause of generating projections by suppressing the dissolution of an aliphatic acid into water. Accordingly, by suppressing an amount of a free aliphatic acid among the aliphatic acid which is not adsorbed to the magnetic powder, etc., generation of projections can be prevented. At this time, it is not necessary to suppress the number of the sodium atom, among the elements forming the surface of the ferromagnetic metallic powder which is subjected to orientation treatment to the magnetic layer, based on the number of the Fe atom to a certain amount. Also, occurrence of crystal of an aliphatic acid metal salt can be suppressed without suppressing the amount the sodium atom based on the Fe atom in terms of the weight ratio in the whole ferromagnetic metallic powder to a certain amount.

The amount of the free aliphatic acid is preferably 8.0 $mg/m^2$ or less, more preferably 4.0 $mg/m^2$ or less, further preferably 1.0 $mg/m^2$ or less. The amount of the free aliphatic acid can be obtained by the measurement method described in Examples mentioned below.

The aliphatic acid may be present at any portion of the recording medium so long as it is contained in the magnetic recording medium, but it is preferred that the lower layer contains the aliphatic acid having a carbon number of 12 to 24.

As the preferred embodiment of the present invention mentioned in the above 1 to 4 and 6 to 9, at least one subbing layer is provided between the non-magnetic support and the magnetic layer. The magnetic powder or the non-magnetic powder contained in the subbing layer preferably contains a sodium ion which releases from the magnetic powder or the non-magnetic powder when they are dipped in water of less than 130 ppm, more preferably 50 ppm or less.

As the magnetic powder to be used in the subbing layer of the present invention, there may be used magnetic powders as disclosed in the paragraph numbers of [0018] and [0019] of Japanese provisional Patent Publication No. 248177/1992, etc., and any of ferromagnetic powder such as ferromagnetic iron oxide powder, ferromagnetic metal powder, hexagonal plate powder, etc. may be used. Above all, ferromagnetic iron oxide powder and ferromagnetic metallic powder are suitable.

Also, as the non-magnetic powder, those conventionally known in the art may be optionally selected and used. For example, there may be mentioned an orgaic powder such as an azo type organic dye pigment, etc., and inorganic powder such as carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, artificial diamond, $\alpha$-iron oxide, garnet, quartz rock, silicon nitride, silicon carbide, molybdenum carbide, boron carbide, tungsten carbide, titanium carbide, tripoli, a diatomaceous earth, dolomite, etc. Of these materials, preferred are inorganic powder such as carbon black, $CaCO_3$, $TiO_2$, barium sulfate, $\alpha$-$Al_2O_3$, $\alpha$-$Fe_2O_3$, $\alpha$-FeOOH, $Cr_2O_3$, etc., further preferably carbon black, $TiO_2$, and $\alpha\text{-}Fe_2O_3$, and most preferably $\alpha\text{-}Fe_2O_3$. When $TiO_2$ is used, it is preferably used in combination with carbon black.

The magnetic powder or the non-magnetic powder to be used may have any shape, but preferably needle material. In the present invention, when a needle shaped powder is used, smoothness of the surface of the subbing layer can be improved whereby smoothness of the magnetic layer laminated thereon can be also improved. The average longer axis diameter of the powder is preferably less than 0.3 µm, more preferably less than 0.20 µm, and the average shorter axis diameter of the powder is preferably less than 0.05 µm, more preferably less than 0.03 µm. The ratio of the axes of the non-magnetic powder is generally 2 to 15, preferably 3 to 10. The ratio of the axes herein mentioned means the ratio of the average longer axis diameter to the average shorter axis diameter (the average longer axis diameter/the average shorter axis diameter). As the needle-like powder to be used, there may be preferably mentioned Co-coated $\gamma\text{-}Fe_2O_3$, $\alpha\text{-}Fe_2O_3$, and $TiO_2$, and particularly preferably a needle shaped $\alpha\text{-}Fe_2O_3$.

Also, the specific surface area of the non-magnetic powder is generally 10 to 250 $m^2/g$, preferably 20 to 150 $m^2/g$. Here, the specific surface area of the non-magnetic powder is represented by a surface area measured by the measurement method of the specific surface area so-called BET method and shown by a square meter per a unit gram. With regard to the specific surface area and the method for measuring the same have been described in detail in "Measurement of Powder Material", written by J. M. Dallavelle and Clyeorr Jr., translated by Muta et al., published by Sangyo Toshosha, japan, and also described in "Chemical Handbook" Applied Chemistry Vol., pp. 1170 to 1171 (Edited by The Chemical Society of Japan, published by Maruzen Co., on Apr. 30, 1966).

The specific surface area is measured by, for example, deaerating powder while heating at about 105° C. for 13 minutes to remove substances absorbed in the powder, then introducing the powder into a measurement device, setting an initial pressure of nitrogen at 0.5 $kg/m^2$ and carrying out measurement at a liquid nitrogen temperature (−105° C.) by nitrogen for 10 minutes. As the measurement device, there may be used, for example, Quantasorb (trade name, produced by Yuasa Ionics Co.).

Also, it is preferred that the non-magnetic powder is subjected to surface treatment with a silicon (Si) compound and/or an aluminum (Al) compound. By using the non-magnetic powder subjected to such surface treatment, a surface state of the upper layer which is a magnetic layer can be improved. Both of the contents of the Si and Al compounds are preferably 0.1 to 10% by weight, respectively, based on the amount of the non-magnetic powder.

Further, an overcoat layer may be provided on the surface of the magnetic layer.

According to the present invention, by controlling the reactions described above by various methods, there can be obtained a magnetic recording medium having high electromagnetic transfer characteristics which are the same as those before storage even when it is stored under high temperature and high humidity for a long period of term.

In the present invention, the shape of the non-magnetic support is not particularly limited and may have a tape shape, a film shape, a sheet shape, a card shape, a disk shape or a drum shape, and the thickness of the non-magnetic support may be selected suitably depending on the purpose of use. Also, the non-magnetic support may be subjected to surface treatment such as corona discharge treatment.

Further, on a surface (back surface) of the non-magnetic support, on which the magnetic layer is not provided, a back coat layer is preferably provided for the purposes of improving runnability of the magnetic recording medium and preventing static charge and transfer thereof. A subbing layer may be also provided between the magnetic layer and the non-magnetic support.

The magnetic layer or the lower layer is not particularly limited except that the specific ferromagnetic metallic powder, magnetic powder or non-magnetic powder described above is contained, and may be formed by using various methods.

The magnetic layer or the lower layer may contain a binder and other components.

As the binder to be used in the magnetic layer or the lower layer, there may be representatively mentioned, for example, a polyurethane, a polyester and a vinyl chloride type resin such as a vinyl chloride type copolymer. These resins preferably have a recurring unit having at least one polar group selected from the group consisting of —$SO_3M$, —$OSO_3M$, —COOM, —$PO(OM^1)_2$ and a sulfobetaine group.

In the above polar groups, M represents a hydrogen atom or an alkali metal such as sodium (Na), potassium (K) and lithium (Li), and $M^1$ represents a hydrogen atom, an alkali metal such as Na, K and Li, or an alkyl group.

In the present invention, as a binder, the following resin may be used in combination in an amount of 20 to 80% by weight based on the amount of all binders.

As the resin, there may be mentioned those having a weight average molecular weight of 10,000 to 200,000 such as a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, a polyvinyl butyral, a cellulose derivative (e.g., nitrocellulose), a styrene-butadiene copolymer, a phenol resin, an epoxy resin, a urea resin, a melamine resin, a phenoxy resin, a silicone resin, an acrylic resin, a urea-formamide resin, various synthetic rubber resin, etc.

In the present invention, in order to improve quality of the magnetic layer or the lower layer, additives such as an abrasive, a lubricant, a hardener, a dispersant, an anti-static agent and conductive fine powder may be contained as other components.

As the abrasive, there may be used, for example, a known compound disclosed in the paragraph number of [0105] of Japanese Provisional Patent Publication No. 214218/1992. The average particle size of the abrasive is generally 0.05 to 0.6 µm, preferably 0.05 to 0.5 µm, particularly preferably 0.05 to 0.3 µm.

The abrasive is contained in the magnetic layer or the lower layer generally in an.amount of 3 to 20 parts by weight, preferably 5 to 15 parts by weight.

As the lubricant, an aliphatic acid and/or an aliphatic acid ester may be used. In this case, the aliphatic acid is added preferably in an amount of 0.2 to 10% by weight, particularly preferably 0.5 to 5% by weight based on the amount of the magnetic powder or the non-magnetic powder. When a lubricating effect is desired to be more heightened by using the aliphatic acid and the aliphatic acid ester in combination, the aliphatic acid and the aliphatic acid ester are preferably used at a weight ratio of 10:90 to 90:10. The aliphatic acid may be either a monobasic acid or a dibasic acid and preferably have 6 to 30 carbon atoms, more preferably 12 to 24 carbon atoms.

As a specific example of the aliphatic acid, there may be mentioned an aliphatic acid disclosed in the paragraph number of [0102] of Japanese Provisional Patent Publication No. 214218/1992, and as a specific example of the aliphatic acid ester, there may be mentioned an aliphatic acid ester disclosed in the paragraph number of [0103] of the above publication.

As a lubricant other than the above aliphatic acid and aliphatic acid ester, there may be used a known compound, for example, silicone oil, fluorinated carbon, aliphatic acid amide and α-olefin oxide.

As the hardener, there may be mentioned a polyisocyanate. As the polyisocyanate, there may be mentioned, for example, an aromatic polyisocyanate such as an adduct of tolylene diisocyanate (TDI), etc. and an active hydrogen compound, etc. and an aliphatic polyisocyanate such as an adduct of hexamethylene diisocyanate (HMDI), etc. and an active hydrogen compound, etc. The weight average molecular weight of the above polyisocyanate is desirably in the range of 100 to 3,000.

As the dispersant, there may be mentioned compounds disclosed in the paragraph number of [0093] of the above publication. These dispersants are generally used in an amount of 0.5 to 5% by weight based on the amount of the magnetic powder or the non-magnetic powder.

As the antistatic agent, there may be mentioned a surfactant disclosed in the paragraph number of [0107] of the above publication. This antistatic agent is generally added in an amount of 0.01 to 40% by weight based on the amount of the binder. Further, in the present invention, conductive fine powder is preferably used as an antistatic agent. As the above antistatic agent, there may be mentioned a pigment (e.g., carbon black, graphite, tin oxide, silver powder, silver oxide, silver nitrate, an organic compound of silver, a metallic particle such as copper powder and a metal oxide such as zinc oxide, barium sulfate and titanium oxide) subjected to coating treatment using a conductive material such as a tin oxide film or an antimony melted-(solid-solution) tin oxide film.

The average particle size of the above conductive fine powder is 5 to 700 nm, preferably 5 to 200 nm. The conductive fine powder is contained in an amount of 1 to 20 parts by weight, preferably 2 to 7 parts by weight based on 100 parts by weight of the magnetic powder or the non-magnetic powder.

In the magnetic recording medium of the present invention, the magnetic layer is preferably provided by coating according to the so-called wet-on-wet coating system in which a magnetic coating is provided by coating while a lower layer is in a wet state. As the wet-on-wet coating system, there may be suitably selected a known method used for preparing a magnetic recording medium having a multi-layer structure.

For example, in general, magnetic powder, a binder, a dispersant, a lubricant, an abrasive and an antistatic agent and a solvent are kneaded to prepare a high concentration magnetic coating, the high concentration magnetic coating is diluted to prepare a magnetic coating and then the magnetic coating is coated on the surface of a non-magnetic support. As the above solvent, there may be used solvents disclosed in the paragraph number of [0119] of Japanese Provisional Patent Publication No. 21418/1991. These various solvents may be used singly or in combination of two or more of them.

When the components for forming the magnetic layer are kneaded, various kneading and dispersing machines can be used. As the kneading and dispersing machine, there may be mentioned a kneading and dispersing machine disclosed in the paragraph number of [0112] of the above publication.

Among the kneading and dispersing machines, kneading and dispersing machines which can provide a load of consumed electric power of 0.05 to 0.5 KW (per 1 kg of the magnetic powder) are a pressure kneader, an open kneader, a continuous kneader, a twin roll mill and a triple roll mill.

When the coating is coated, a combination of a reverse roll and an extrusion coater or a combination of a gravure roll and an extrusion coater may be used in the wet-on-wet coating system. Further, an air doctor coater, a blade coater, an air knife coater, a squeeze coater, an impregnation coater, a transfer roll coater, a kiss coater, a cast coater or a spray coater may be used in combination.

In multilayer coating in the wet-on-wet coating system, an upper layer is coated while a lower layer is in a wet state, whereby the surface of the lower layer (that is, an interface of the lower and upper layers) is smooth, surface characteristics of the upper layer are good and adhesiveness between the upper and lower layers is improved.

As a result, characteristics particularly required for a high density magnetic recording medium can be satisfied. Further, film strength is improved, durability is sufficient and dropout can be reduced by the wet-on-wet coating system to increase reliability.

Next, surface-smoothing treatment using a calender may be carried out. Subsequently, varnish treatment or blade treatment is carried out, if necessary, and a material obtained is slitted.

As calendering conditions in the surface-smoothing treatment, there may be mentioned a temperature, a linear pressure sure and a treatment rate (C/S). In the present invention, it is preferred to maintain the above temperature at 50° to 140° C., the above linear pressure at 50 to 1,200 kg/cm and the above C/S at 20 to 600 m/min. If the above temperature, linear pressure and C/S fall outside the above range, it is difficult to maintain good surface characteristics of the magnetic recording medium.

EXAMPLES

The constitution and effects of the present invention are described in detail by referring to Examples. However, as a matter of course, components, rates thereof and a order of procedures described below can be modified variously within the range which does not fall outside the scope of the present invention, and the scope of the present invention is not limited by the following Examples. In the respective Tables, "*" and "**" mean that the material is not contained or an amount is lower than the limit of detection.

In the following Examples, "part" means "part by weight".

The respective components of magnetic coatings for an upper layer and coatings for a lower layer having the following compositions were kneaded and dispersed by using a kneader and a sand mill, respectively, to prepare magnetic coatings for an upper layer and coatings for a lower layer.

| <Magnetic coatings for upper layer> | |
|---|---|
| Ferromagnetic metallic powder (longer axis diameter: 0.12 μm, Hc (coercive force): 1,900 Oe, BET: 55 m$^2$/g, σs (saturation magnetization): 125 emu/g, crystallite size: 150 Å, needle ratio: 8, pH: 9.0) (Compositions are shown in Tables 3-a, 4, 6-a, 7-a, 9, 11, 13 and 15) | 100 parts |

-continued

<Magnetic coatings for upper layer>

| | |
|---|---|
| Vinyl chloride type resin having a potassium sulfonate group, MR-110 (trade name, produced by Nihon Zeon Co.) | 10 parts |
| Polyurethane resin having a sodium sulfonate group, UR-8700 (trade name, produced by Toyo Boseki Co.) | 10 parts |
| α-Alumina (average particle size: 0.15 μm) | 8 parts |
| Aliphatic acid (stearic acid unless otherwise mentioned in the tables) | 1 part |
| Butyl stearate | 1 part |
| Cyclohexanone | 100 parts |
| Methyl ethyl ketone | 100 parts |
| Toluene | 100 parts |

<Coatings A for lower layer>

| | |
|---|---|
| Co-γ-Fe$_2$O$_3$ (shown in Tables 3-a, 5, 6-a, 7-a, 8, 9, 12, 13, 15 and 17-a ((longer axis diameter: 0.20 μm, Hc (coercive force): 700 Oe, BET: 45 m$^2$/g, σs (saturation magnetization): 75 emu/g, crystallite size: 250 Å, pH: 8.5, axial ratio: 10), with a surface treated with Si and Al compounds, Si content: 0.1% by weight, Al content: 0.3% by weight, amounts of water-soluble Na and Na soluble in hydrochloric acid are shown in the tables) | 100 parts |
| Vinyl chloride type resin having a potassium sulfonate group, MR-110 (trade name, produced by Nihon Zeon Co.) | 12 parts |
| Polyurethane resin having a sodium sulfonate group, UR-8700 (trade name, produced by Toyo Boseki Co.) | 8 parts |
| α-Alumina (average particle size: 0.2 μm) | 5 parts |
| Carbon black (DBP oil-absorbing amount: 85 ml/100 g, pH: 8.2, BET: 260 m$^2$/g, volatile amount: 1.2%, tinting strength: 140%, average particle size: 15 nm) | 10 parts |
| Aliphatic acid (carbon numbers are shown in Tables 3-a, 5, 6-a, 7-a, 8, 9, 12, 13, 15 and 17-a) | 1 part |
| Butyl stearate | 1 part |
| Cyclohexanone | 100 parts |
| Methyl ethyl ketone | 100 parts |
| Toluene | 100 parts |

Five parts of a polyisocyanate compound Colonate L (trade name, produced by Nippon Polyurethane Kogyo Co.) was added to the resulting magnetic coatings for an upper layer and Coatings A for a lower layer, respectively.

<Coatings B for lower layer>

Coatings B for a lower layer were obtained in the same manner ner as in Coatings A for a lower layer except for using needle α-Fe$_2$O$_3$ (longer axis diameter: 0.13 μm, axial ratio: 7, BET: 55 m$^2$/g, pH: 7.5, crystallite size: 200 Å, with a surface treated with Si and Al compounds (Si content: 0.1% by weight, Al content: 0.3% by weight)) in place of Co-γ-Fe$_2$O$_3$ used in Coatings A for a lower layer.

<Coatings C for lower layer>

Coatings C for a lower layer were obtained in the same manner as in Coatings A for a lower layer except for using spherical α-Fe$_2$O$_3$ (average particle size: 35 nm, BET: 40 m$^2$/g, pH: 6.5, with a surface treated with Si and Al compounds (Si content: 0.1% by weight, Al content: 0.3% by weight)) in place of Co-γ-Fe$_2$O$_3$ used in Coatings A for a lower layer.

Examples 1-1 to 10-5 and Comparative examples 5-1 to 10-4

After the above magnetic coatings for an upper layer and coatings for a lower layer each containing ferromagnetic metallic powder shown in the respective tables were coated on a polyethylene terephthalate film having a thickness of 10 μm according to the wet-on-wet method, respectively, magnetic orientation treatment was carried out while coated films were not dried. Subsequently, the coated films were dried and subjected to surface-smoothing treatment by using a calender to prepare magnetic layers each comprising a lower layer and an upper layer having thicknesses shown in the respective tables.

Further, on each other surface (back surface) opposite to a side on which the magnetic layer was formed of the above polyethylene terephthalate film, a coating having the following composition was coated. A coated film was dried and then subjected to calendering under the above calendering conditions to form a back coat layer having a thickness of 0.8 μm, whereby a wide raw magnetic tape was obtained.

| | |
|---|---|
| Carbon black Raven 1035 (trade name, produced by Columbian Carbon Co.) (average particle size: 25 nm) | 40 parts |
| Barium sulfate (average particle size: 300 nm) | 10 parts |
| Nitrocellulose | 25 parts |
| Polyurethane type resin N-2301 (trade name, produced by Nippon Polyurethane Co.) | 25 parts |
| Polyisocyanate compound Colonate L (trade name, produced by Nippon Polyurethane Co.) | 10 parts |
| Cyclohexanone | 400 parts |
| Methyl ethyl ketone | 250 parts |
| Toluene | 250 parts |

The raw magnetic tapes thus obtained were slitted to prepare magnetic recording media for video having a width of 8 mm. The following evaluations of the magnetic recording media were conducted. The results are shown in Tables 3-b, 5, 6-b, 7-b, 8, 10, 12, 14, 16 and 17-b.

<Evaluations>

<Surface composition of ferromagnetic metallic powder existing on magnetic coated film>: measured according to the method described above.

<Entire composition of ferromagnetic metallic powder>: measured according to the method described above.

<Surface composition of ferromagnetic metallic powder>: measured according to the method described above.

<Amount of metal ion released from ferromagnetic metallic powder when dipped in water>: measured according to the method described above.

<Amount of sodium released from ferromagnetic metallic powder when dipped in hydrochloric solution>: measured according to the method described above.

<Method of measuring free aliphatic acid> a. 50 ml of cyclohexane was added to a sample having a size of 253 cm$^2$, the sample was boiled under reflux for 1 hour and then a temperature thereof was returned to room temperature. The sample was washed with a small amount of cyclohexane and then the washed solution was combined with the extracted solution (the solution after the reflux).

b. To the extracted solution was added, as an internal standard, 5 ml of a solution of methyl palmitate/cyclohexane prepared so as to have a concentration of methyl palmitate to 40 ppm.

c. By using a rotary evaporator, cyclohexane was distilled out from the solution.

d. 0.2 ml of cyclohexane was newly added to the condensed extract, and 1 μl of the mixture was applied to gas chromatography.

e. The amount of aliphatic acid extracted was determined from a calibration curve previously prepared from a relation between concentrations and peak areas of methyl palmitate and aliphatic acid. The resulting value was converted into a value per unit area of 1 m².

For the above gas chromatography, a gas chromatograph HP5890A (trade name) manufactured by Yokokawa Denki Co. and a column Ultra 1 (trade name) manufactured by Hewlet Packard were used.

<Reproduction output>

By using an 8 mm videocamera CCDV-900 (trade name) manufactured by Sony Co., RF outputs (dB) at 7 MHz and 9 MHz were measured.

Both of the samples before storage and after storage at 50° C. and 80% RH (relative humidity) for 120 hours (in a cassette state) were measured.

<Head clogging>

By using an 8 mmvideodeck EVO-550 (trade name) manufactured by Sony Co., a tape on which recording had entirely been made was repeatedly run 100 pass times under circumstances shown in the tables. The number of pass times when head clogging was caused was measured.

Both of the samples before storage and after storage at 50° C. and 80% RH for 120 hours (in a cassette state) were measured.

<Dropout>

Dropout was measured before and after the samples were stored. By using an 8 mm videodeck EVS-900 (trade name) manufactured by Sony Co., dropout was measured with Hi8 mode. As an input signal, a stair step wave of a monochromatic signal was recorded. By using a dropout counter VH01BZ (trade name) manufactured by SHIBASOKU, the average value of the number of times when output is lowered by 10 μs/-12 dB or more per unit time of one minute was determined.

Both of the samples before storage and after storage at 50° C. and 80% RH for 120 hours (in a cassette state) were measured.

TABLE 3-b

| | Reproduction output (9 MHz) (dB) | | Dropout (5 μs/−8 dB) (1/min) | | Head clogging at 23° C./50 % RH (time/pass) | |
|---|---|---|---|---|---|---|
| | Before storage | After storage | Before storage | After storage | Before storage | After storage |
| Example 1-1 | 1.0 | 1.1 | 15 | 20 | 1 | 0 |
| Example 1-2 | 1.0 | 1.2 | 2 | 3 | 0 | 0 |
| Example 1-3 | 1.0 | 0.9 | 5 | 6 | 0 | 1 |
| Example 1-4 | 1.5 | 1.3 | 10 | 8 | 0 | 0 |
| Example 1-5 | 2.5 | 2.2 | 5 | 5 | 0 | 0 |
| Example 1-6 | 3.0 | 2.8 | 3 | 4 | 0 | 0 |
| Example 1-7 | 2.0 | 1.8 | 10 | 13 | 0 | 1 |
| Example 1-8 | 1.8 | 1.6 | 40 | 35 | 1 | 0 |
| Example 1-9 | 1.8 | 1.6 | 10 | 16 | 1 | 0 |
| Example 1-10 | 2.0 | 2.0 | 15 | 20 | 0 | 1 |
| Example 1-11 | 1.0 | 1.2 | 20 | 15 | 0 | 1 |

TABLE 3-a

| | Upper layer | | | | | | Lower layer | | | |
|---|---|---|---|---|---|---|---|---|---|---|
| | Surface composition of ferromagnetic metallic powder in medium (atom number of each element based on 100 Fe atoms) | | | | Film thickness (μm) | Aliphatic acid Carbon number | Film thickness (μm) | Kind of powder | Amount of water-soluble Na (ppm) | Amount of Na soluble in hydro chloric acid (ppm) |
| | Na | Alkaline earth | | Rare earth | | | | | | |
| Example 1-1 | 0.9 | Ca 1 | | Nd 48 | 0.40 | 12 | 1.5 | Magnetic A | 10 | 16 |
| Example 1-2 | 0.3 | Ca 39 | | Nd 1 | 0.60 | 24 | 2.0 | Magnetic A | 8 | 16 |
| Example 1-3 | 0.7 | Ca 10 | | Sm 35 | 0.50 | 18 | 1.8 | Magnetic A | 25 | 40 |
| Example 1-4 | 0.2 | Ca 5 Ba 10 | | Nd 15 | 0.30 | 18 | 1.2 | Magnetic A | 1 | 20 |
| Example 1-5 | 0.2 | Ca 5 Ba 10 | | Nd 15 | 0.18 | 18 | 1.2 | Non-magnetic B | 20 | 30 |
| Example 1-6 | 0.2 | Ca 5 Ba 10 Sr 10 | | Nd 15 | 0.20 | 18 | 1.5 | Non-magnetic B | 5 | 10 |
| Example 1-7 | 0.1 | Ba 15 | | Nd 15 | 0.20 | 18 | 2.0 | Non-magnetic B | 10 | 15 |
| Example 1-8 | 0.4 | Mg 5 Ra 10 | | Nd 10 | 0.02 | 18 | 0.2 | Non-magnetic B | 97 | 127 |
| Example 1-9 | 0.1 | Ca 20 | | La 10 | 0.50 | 16 | 1.0 | Non-magnetic B | 2 | 10 |
| Example 1-10 | 0.2 | Ca 1 | | Y 25 | 0.40 | 14 | 2.0 | Non-magnetic B | 10 | 15 |
| Example 1-11 | 0.3 | Ca 15 | | Nd 20 | 2.00 | S 18 | *** | **** | *** | *** |

TABLE 4

| | Upper layer | | | | | | | | | | | | | |
|---|---|---|---|---|---|---|---|---|---|---|---|---|---|---|
| | Entire composition of ferromagnetic metallic powder (parts by weight of each element) based on 100 parts by weight of Fe atoms) | | | | | | | Surface composition of ferromagnetic metallic powder (atom number of each element based on 100 Fe atoms) | | | | | | Film thickness (μm) |
| | Al | Alkaline earth | | | | Rare earth | Na | Al | Alkaline earth | | | Rare earth | Na | |
| Example 2-1 | 2 | Ca | 0.1 | | | Y | 5 | 0.009 | 70 | Ca | 1 | | Y | 45 | 3.9 | 0.20 |
| Example 2-2 | 10 | Ca | 0.3 | | | Sm | 1 | 0.003 | 300 | Ca | 40 | | Sm | 0.5 | 1.0 | 0.25 |
| Example 2-3 | 5 | Ca | 5.0 | | | La | 8 | 0.002 | 200 | Ca | 20 | | La | 60 | 2.0 | 0.50 |
| Example 2-4 | 3 | Ca | 0.2 Ba | 2.0 Sr | 1.0 | Nd | 4 | 0.004 | 130 | Ca | 5 Ba | 12 Sr | 10 Nd | 10 | 1.6 | 0.30 |
| Example 2-5 | 3 | Ca | 0.2 Ba | 2.0 Sr | 1.0 | Nd | 4 | 0.004 | 130 | Ca | 5 Ba | 12 Sr | 10 Nd | 10 | 1.6 | 0.18 |
| Example 2-6 | 3 | Ca | 0.2 Ba | 1.5 | | Nd | 3 | 0.002 | 100 | Ca | 5 Ba | 15 | Nd | 15 | 1.5 | 0.20 |
| Example 2-7 | 4 | Ba | 2.0 | | | Y | 2 | 0.008 | 150 | Ba | 20 | | Y | 20 | 1.0 | 0.60 |
| Example 2-8 | 5 | Mg | 0.5 Ra | 2.0 | | Y | 4 | 0.004 | 120 | Mg | 10 Ra | 20 | Y | 50 | 0.5 | 0.02 |
| Example 2-9 | 3 | Ca | 0.5 Ba | 2.0 | | Nd | 3 | 0.001 | 110 | Ca | 15 Ba | 25 | Nd | 10 | 0.1 | 0.50 |
| Example 2-10 | 3 | Ca | 0.2 Ba | 1.5 | | Nd | 3 | 0.002 | 100 | Ca | 5 Ba | 15 | Nd | 15 | 1.5 | 2.1 |

TABLE 5

| | Lower layer | | | | Reproduction output (9 MHz) (dB) | | Dropout (5 μs/−8 dB) (l/min) | | Head clogging at 40° C./80 % RH (time/pass) | |
|---|---|---|---|---|---|---|---|---|---|---|
| | Aliphatic acid Carbon number | Film thickness (μm) | Kind of powder | Amount of water-soluble Na (ppm) | Amount of Na soluble in hydrochloric acid (ppm) | Before storage | After storage | Before storage | After storage | Before storage | After storage |
| Example 2-1 | 12 | 1.1 | Magnetic A | 12 | 18 | 1.5 | 1.3 | 10 | 15 | 1 | 0 |
| Example 2-2 | 24 | 0.2 | Magnetic A | 8 | 25 | 1.2 | 1.5 | 15 | 14 | 0 | 1 |
| Example 2-3 | 18 | 2.0 | Magnetic A | 10 | 45 | 1.6 | 1.3 | 12 | 6 | 1 | 1 |
| Example 2-4 | 18 | 1.8 | Magnetic A | 2 | 4 | 2.0 | 1.9 | 8 | 10 | 1 | 1 |
| Example 2-5 | 18 | 1.8 | Non-magnetic B | 20 | 30 | 3.0 | 2.8 | 2 | 6 | 0 | 1 |
| Example 2-6 | 18 | 1.6 | Non-magnetic B | 10 | 16 | 2.0 | 2.0 | 5 | 6 | 1 | 0 |
| Example 2-7 | 18 | 1.5 | Non-magnetic B | 15 | 18 | 1.4 | 1.5 | 8 | 8 | 1 | 0 |
| Example 2-8 | 16 | 1.3 | Non-magnetic B | 6 | 12 | 1.0 | 1.2 | 9 | 14 | 0 | 1 |
| Example 2-9 | 14 | 1.5 | Non-magnetic B | 15 | 30 | 1.5 | 1.3 | 12 | 15 | 0 | 1 |
| Example 2-10 | S 18 | *** | **** | *** | *** | 1.2 | 0.9 | 13 | 11 | 1 | 1 |

S: Added to the coating for an upper layer
A: Co-coated iron oxide (magnetic)
B: Needle iron oxide (non-magnetic)

TABLE 6-a

| | Upper layer | | | | | Lower layer | | | |
|---|---|---|---|---|---|---|---|---|---|
| | Amount of water-soluble Na (ppm) | Amount of water-soluble alkaline earth (ppm) | Amount of Na soluble in hydrochloric acid (ppm) | Film thickness (μm) | Aliphatic acid Carbon number | Film thickness (μm) | Kind of powder | Amount of water-soluble Na (ppm) | Amount of Na soluble in hydrochloric acid (ppm) |
| Example 3-1 | 195 | Ca 28 | 295 | 0.30 | 12 | 2.0 | Magnetic A | 10 | 50 |
| Example 3-2 | 150 | Ba 10 | 250 | 0.60 | 24 | 0.2 | Magnetic A | 28 | 80 |
| Example 3-3 | 15 | Ca 0 | 30 | 0.18 | 18 | 1.8 | Magnetic A | 10 | 25 |

TABLE 6-a-continued

| | Upper layer | | | | Lower layer | | | | |
|---|---|---|---|---|---|---|---|---|---|
| | Amount of water-soluble Na (ppm) | Amount of water-soluble alkaline earth (ppm) | Amount of Na soluble in hydrochloric acid (ppm) | Film thickness (μm) | Aliphatic acid Carbon number | Film thickness (μm) | Kind of powder | Amount of water-soluble Na (ppm) | Amount of Na soluble in hydrochloric acid (ppm) |
| Example 3-4 | 15 | Ca 0 | 30 | 0.18 | 18 | 1.8 | Non-magnetic B | 65 | 90 |
| Example 3-5 | 8 | Ba 1 | 25 | 0.40 | 18 | 1.4 | Non-magnetic B | 12 | 25 |
| Example 3-6 | 50 | Sr 2 | 60 | 0.20 | 18 | 1.5 | Non-magnetic B | 20 | 40 |
| Example 3-7 | 100 | Ca 12 | 110 | 2.00 | S 18 | *** | **** | *** | *** |

S: Added to the coating for an upper layer,
A: Co-coated iron oxide (magnetic)
B: Needle iron oxide (non-magnetic)

TABLE 6-b

| | Reproduction output (9 MHz) (dB) | | Dropout (5 μs/−8 dB) (1/min) | | Head clogging at 40° C./20% RH (time/pass) | |
|---|---|---|---|---|---|---|
| | Before storage | After storage | Before storage | After storage | Before storage | After storage |
| Example 3-1 | 1.5 | 1.0 | 10 | 15 | 1 | 0 |
| Example 3-2 | 1.0 | 0.8 | 8 | 10 | 0 | 0 |
| Example 3-3 | 2.5 | 2.4 | 3 | 4 | 0 | 0 |
| Example 3-4 | 3.5 | 3.3 | 6 | 8 | 0 | 0 |
| Example 3-5 | 3.0 | 3.2 | 5 | 10 | 0 | 0 |
| Example 3-6 | 2.5 | 2.3 | 7 | 3 | 0 | 1 |
| Example 3-7 | 1.5 | 1.3 | 8 | 8 | 1 | 1 |

TABLE 7-a

| | Upper layer | | | | | Lower layer | | | | |
|---|---|---|---|---|---|---|---|---|---|---|
| | *1 | *2 (ppm) | *3 (ppm) | | Film thickness (μm) | Aliphatic acid carbon number | Film thickness (μm) | Kind of powder | Amount of water-soluble Na (ppm) | Amount of Na soluble in hydrochloric acid (ppm) |
| Example 4-1 | Y | 10 Na | 100 Na | 130 | 0.30 | 18 | 1.8 | Magnetic A | 10 | 15 |
| Example 4-2 | La | 15 Na | 90 Na | 100 | 0.55 | 18 | 2.0 | Non-magnetic B | 20 | 22 |
| Example 4-3 | Ce | 85 Li | 30 Li | 60 | 0.10 | 12 | 1.5 | Non-magnetic B | 30 | 35 |
| Example 4-4 | La | 5 K | 50 K | 50 | 0.15 | 24 | 1.2 | Non-magnetic B | 10 | 12 |
| Example 4-5 | Nd | 2 Na | 130 Na | 160 | 0.18 | 16 | 1.5 | Non-magnetic B | 13 | 16 |
| Example 4-6 | Mg | 10 Rb | 190 Rb | 280 | 0.25 | 14 | 1.4 | Non-magnetic B | 10 | 15 |
| Example 4-7 | Sr | 10 Na | 160 Na | 200 | 0.40 | 18 | 0.4 | Non-magnetic B | 5 | 10 |
| Example 4-8 | Ca | 13 Na | 30 Na | 30 | 0.30 | 16 | 1.2 | Non-magnetic B | 2 | 10 |
| Example 4-9 | Ba | 15 Na | 50 Na | 60 | 0.25 | 18 | 1.3 | Non-magnetic B | 15 | 13 |
| Example 4-10 | Mn | 2 Cs | 30 Cs | 80 | 0.20 | 18 | 1.5 | Magnetic A | 10 | 20 |
| Example 4-11 | Co | 1 Na | 20 Na | 30 | 0.20 | 16 | 1.5 | Magnetic A | 1 | 3 |
| Example 4-12 | Ni | 3 Na | 100 Ca | 160 | 0.20 | 18 | 1.5 | Magnetic A | 2 | 6 |
| Example 4-13 | Tl | 1 Na | 150 Na | 130 | 0.20 | 16 | 1.3 | Magnetic A | 10 | 13 |
| Example 4-14 | Ca | 5 Na | 100 Na | 150 | 2.0 | S 18 | *** | **** | *** | *** |

TABLE 7-b

| | Reproduction output (9 MHz) (dB) | | Dropout (5 μs/−8 dB) (l/min) | | Head clogging at 0° C. (time/pass) | |
|---|---|---|---|---|---|---|
| | Before storage | After storage | Before storage | After storage | Before storage | After storage |
| Example 4-1 | 1.0 | 0.8 | 10 | 12 | 1 | 0 |
| Example 4-2 | 2.0 | 2.1 | 15 | 14 | 0 | 0 |
| Example 4-3 | 2.3 | 2.1 | 14 | 10 | 0 | 0 |
| Example 4-4 | 2.0 | 2.0 | 13 | 19 | 0 | 0 |
| Example 4-5 | 2.0 | 2.2 | 10 | 15 | 0 | 0 |
| Example 4-6 | 1.5 | 1.3 | 12 | 13 | 0 | 0 |
| Example 4-7 | 2.0 | 2.4 | 5 | 10 | 0 | 0 |
| Example 4-8 | 2.5 | 2.0 | 3 | 5 | 0 | 0 |
| Example 4-9 | 3.0 | 3.0 | 2 | 4 | 0 | 0 |
| Example 4-10 | 2.0 | 1.8 | 12 | 15 | 1 | 1 |
| Example 4-11 | 1.2 | 1.1 | 12 | 13 | 0 | 0 |
| Example 4-12 | 1.0 | 1.2 | 10 | 13 | 0 | 0 |
| Example 4-13 | 0.8 | 1.0 | 12 | 17 | 0 | 0 |
| Example 4-14 | 1.0 | 1.0 | 5 | 9 | 0 | 0 |

TABLE 8

| | *Upper layer | Lower layer | | | | Reproduction output (9 MHz) (dB) | | Dropout (5 μs/−8 dB) (l/min) | | Head clogging at 45° C./85 % RH (time/pass) | |
|---|---|---|---|---|---|---|---|---|---|---|---|
| | Film thickness (μm) | Aliphatic acid carbon number | Film thickness (μm) | Kind of powder | Amount of water-soluble Na (ppm) | Amount of Na soluble in hydrochloric acid (ppm) | Before storage | After storage | Before storage | After storage | Before storage | After storage |
| Example 5-1 | 0.55 | 18 | 1.9 | Magnetic A | 95 | 125 | 1.0 | 1.0 | 10 | 13 | 1 | 0 |
| Example 5-2 | 0.30 | 18 | 1.5 | Non-magnetic B | 30 | 35 | 2.5 | 2.3 | 15 | 20 | 0 | 0 |
| Example 5-3 | 0.30 | 12 | 0.2 | Non-magnetic B | 30 | 34 | 3.0 | 2.8 | 4 | 10 | 0 | 0 |
| Example 5-4 | 0.30 | 24 | 1.0 | Non-magnetic B | 33 | 35 | 2.8 | 3.0 | 13 | 20 | 0 | 0 |
| Example 5-5 | 0.15 | 16 | 1.5 | Non-magnetic B | 50 | 80 | 2.0 | 2.0 | 30 | 35 | 0 | 1 |
| Comparative example 5-1 | 0.30 | 18 | 1.5 | Non-magnetic B | 50 | 350 | 1.5 | −3.0 | 15 | 400 | 1 | 36 |
| Comparative example 5-2 | 0.30 | 16 | 1.5 | Non-magnetic B | 200 | 300 | 0.5 | −5.0 | 20 | 340 | 2 | 35 |
| Comparative example 5-3 | 0.25 | 18 | 1.5 | Magnetic A | 80 | 190 | 0.5 | −3.0 | 15 | 200 | 0 | 30 |
| Comparative example 5-4 | 0.30 | 16 | 1.0 | Magnetic A | 125 | 160 | 0.0 | −2.5 | 10 | 150 | 1 | 16 |
| Comparative example 5-5 | 0.40 | 18 | 1.5 | Magnetic A | 130 | 130 | 0.5 | −0.5 | 15 | 200 | 1 | 20 |

A: Co-coated iron oxide (magnetic)
B: Needle iron oxide (non-magnetic)
C: Spherical iron oxide (non-magnetic)
*Magnetic powder is the same as used in the upper layer of Comparative example 1-4

TABLE 9

| | Upper layer | | | | | | Lower layer | | |
|---|---|---|---|---|---|---|---|---|---|
| | Surface composition of ferromagnetic metallic powder in medium (atom number of each element based on 100 Fe atoms) | | | Film thickness (μm) | Aliphatic acid carbon number | Amount of free aliphatic acid (mg/m²) | Film thickness (μm) | Kind of powder | Amount of water-soluble Na (ppm) | Amount of Na soluble in hydrochloric acid (ppm) |
| | Na | Alkaline earth | Rare earth | | | | | | | |
| Example 6-1 | 2 Ca | 10 | Nd 10 | 0.55 | 18 | 0.2 | 1.5 | Non-magnetic B | 5 | 10 |
| Example 6-2 | 3 Ca | 15 Ba 15 | Nd 10 | 0.20 | 16 | 1.0 | 1.1 | Non-magnetic B | 15 | 20 |
| Example 6-3 | 4 Ca | 5 Ba 15 Sr 15 | Nd 10 | 0.30 | 18 | 0.1 | 1.3 | Non-magnetic B | 20 | 40 |
| Example 6-4 | 3 Ca | 1 | Y 20 | 0.20 | 18 | 1.0 | 1.8 | Non-magnetic B | 30 | 60 |
| Example 6-5 | 8 Ca | 30 Mg 5 | Sm 10 | 0.50 | 24 | 4.0 | 2.0 | Magnetic A | 5 | 20 |
| Example 6-6 | 6 Ra | 20 | La 50 | 0.20 | 18 | 8.0 | 1.5 | Magnetic A | 10 | 30 |
| Example 6-7 | 2 Ca | 12 | Nd 20 | 2.00 | 18 | 0.2 | *** | **** | *** | *** |
| Comparative example 6-1 | 2 Ca | 15 | Nd 15 | 2.00 | 18 | 10.0 | *** | **** | *** | *** |
| Comparative example 6-2 | 5 Ba | 15 | Nd 20 | 0.40 | 18 | 9.0 | 2.0 | Non-magnetic B | 30 | 60 |

A: Co-coated iron oxide (magnetic)
B: Needle iron oxide (non-magnetic)
C: Spherical iron oxide (non-magnetic)

TABLE 10

| | Reproduction output (9 MHz) (dB) | | Dropout (5 μs/−8 dB) (1/min) | | Head clogging at 23° C./60 % RH (time/pass) | |
|---|---|---|---|---|---|---|
| | Before storage | After storage | Before storage | After storage | Before storage | After storage |
| Example 6-1 | 2.0 | 1.9 | 10 | 13 | 0 | 0 |
| Example 6-2 | 2.5 | 2.3 | 5 | 6 | 0 | 0 |
| Example 6-3 | 3.5 | 3.1 | 1 | 3 | 0 | 0 |
| Example 6-4 | 2.0 | 2.0 | 2 | 5 | 0 | 1 |
| Example 6-5 | 1.0 | 0.8 | 20 | 25 | 1 | 2 |
| Example 6-6 | 1.5 | 1.0 | 11 | 13 | 3 | 4 |
| Example 6-7 | 1.0 | 0.8 | 25 | 30 | 1 | 1 |
| Comparative example 6-1 | 0.5 | −2.0 | 10 | 250 | 1 | 25 |
| Comparative example 6-2 | 1.5 | −4.5 | 8 | 360 | 3 | 30 |

TABLE 11

| | Entire composition of ferromagnetic metallic powder (parts by weight of each element) based on 100 parts by weight of Fe atoms | | | | | Surface composition of ferromagnetic metallic powder (atom number of each element based on 100 Fe atoms) | | | | | Film thickness (μm) |
|---|---|---|---|---|---|---|---|---|---|---|---|
| | Al | Alkaline earth | Rare earth | Na | | Al | Alkaline earth | Rare earth | Na | | |
| Example 7-1 | 2 | Ca 0.1 | Y 5 | 0.009 | | 70 | Ca 1 | Y 45 | 5.0 | | 0.20 |
| Example 7-2 | 10 | Ca 0.3 | Sm 1 | 0.003 | | 300 | Ca 40 | Sm 0.5 | 6.0 | | 0.25 |
| Example 7-3 | 5 | Ca 5.0 | La 8 | 0.002 | | 200 | Ca 20 | La 60 | 10.0 | | 0.50 |
| Example 7-4 | 3 | Ca 0.2 Ba 2.0 Sr 1.0 | Nd 4 | 0.004 | | 130 | Ca 5 Ba 12 Sr 10 | Nd 10 | 12.0 | | 0.30 |
| Example 7-5 | 3 | Ca 0.2 Ba 2.0 Sr 1.0 | Nd 4 | 0.004 | | 130 | Ca 5 Ba 12 Sr 10 | Nd 10 | 8.0 | | 0.18 |
| Example 7-6 | 3 | Ca 0.2 Ba 1.5 | Nd 3 | 0.002 | | 100 | Ca 5 Ba 15 | Nd 15 | 4.5 | | 0.20 |
| Example 7-7 | 4 | Ba 2.0 | Y 2 | 0.008 | | 150 | Ba 20 | Y 20 | 6.0 | | 0.60 |
| Example 7-8 | 5 | Mg 0.5 Ra 2.0 | Y 4 | 0.004 | | 120 | Mg 10 Ra 20 | Y 50 | 10.0 | | 0.02 |
| Example 7-9 | 3 | Ca 0.5 Ba 2.0 | Nd 3 | 0.001 | | 110 | Ca 15 Ba 25 | Nd 10 | 13.0 | | 0.50 |
| Example 7-10 | 3 | Ca 0.2 Ba 1.5 | Nd 3 | 0.002 | | 100 | Ca 5 Ba 15 | Nd 15 | 9.0 | | 2.1 |
| Comparative example 7-1 | 3 | Ca 0.2 Ba 2.0 Sr 1.0 | Nd 4 | 0.004 | | 130 | Ca 5 Ba 12 Sr 10 | Nd 10 | 8.0 | | 0.40 |

TABLE 11-continued

| | Upper layer | | | | | | | | | |
|---|---|---|---|---|---|---|---|---|---|---|
| | Entire composition of ferromagnetic metallic powder (parts by weight of each element) based on 100 parts by weight of Fe atoms) | | | | | Surface composition of ferromagnetic metallic powder (atom number of each element based on 100 Fe atoms) | | | | Film thickness ($\mu$m) |
| | Al | Alkaline earth | | Rare earth | Na | Al | Alkaline earth | | Rare earth | Na | |
| Comparative example 7-2 | 5 | *** | | *** | 0.2 | 400 | *** | | *** | 15.0 | 0.30 |
| Comparative example 7-3 | 4 | Ca | 2.0 | Nd 3 | 0.008 | 120 | Ba | 20 | Nd 20 | 6.0 | 0.50 |

15

TABLE 12

| | Lower layer | | | | | Reproduction output (9 MHz) (dB) | | Dropout (5 $\mu$s/−8 dB) (l/min) | | Head clogging at 40° C./80 % RH (time/pass) | |
|---|---|---|---|---|---|---|---|---|---|---|---|
| | Aliphatic acid carbon number | Amount of free aliphatic acid (mg/m$^2$) | Film thickness ($\mu$m) | Kind of powder | Amount of water-soluble Na (ppm) | Amount of Na soluble in hydrochloric acid (ppm) | | | | | |
| | | | | | | Before storage | After storage | Before storage | After storage | Before storage | After storage |
| Example 7-1 | 12 | 0.2 | 1.1 | Magnetic A | 12 | 18 | 1.6 | 1.3 | 8 | 15 | 1 | 0 |
| Example 7-2 | 24 | 0.1 | 0.2 | Magnetic A | 8 | 25 | 1.4 | 1.6 | 13 | 14 | 0 | 0 |
| Example 7-3 | 18 | 0.0 | 2.0 | Magnetic A | 10 | 45 | 1.8 | 1.4 | 10 | 6 | 0 | 0 |
| Example 7-4 | 18 | 0.1 | 1.8 | Magnetic A | 2 | 4 | 2.2 | 1.9 | 10 | 10 | 0 | 0 |
| Example 7-5 | 18 | 0.2 | 1.8 | Non-magnetic B | 20 | 30 | 3.3 | 3.0 | 3 | 6 | 0 | 0 |
| Example 7-6 | 18 | 0.2 | 1.6 | Non-magnetic B | 10 | 16 | 2.2 | 2.0 | 6 | 6 | 1 | 0 |
| Example 7-7 | 18 | 0.5 | 1.5 | Non-magnetic B | 15 | 18 | 1.5 | 1.6 | 9 | 8 | 0 | 0 |
| Example 7-8 | 16 | 7.5 | 1.3 | Non-magnetic B | 6 | 12 | 1.1 | 1.0 | 12 | 14 | 0 | 0 |
| Example 7-9 | 14 | 0.2 | 1.5 | Non-magnetic B | 15 | 30 | 1.6 | 1.4 | 14 | 15 | 0 | 1 |
| Example 7-10 | 18 | 0.1 | *** | **** | *** | *** | 1.3 | 1.0 | 20 | 22 | 1 | 0 |
| Comparative example 7-1 | 18 | 10.0 | 1.5 | Non-magnetic B | 55 | 160 | 3.0 | −5.0 | 15 | 255 | 0 | 20 |
| Comparative example 7-2 | 16 | 20.0 | 1.2 | Non-magnetic C | 5 | 150 | 1.0 | −3.5 | 10 | 240 | 3 | 30 |
| Comparative example 7-3 | 14 | 12.0 | 1.3 | Magnetic A | 140 | 160 | 0.0 | −4.0 | 15 | 280 | 1 | 19 |

A: Co-coated iron oxide (magnetic)
B: Needle iron oxide (non-magnetic)
C: Spherical iron oxide (non-magnetic)

TABLE 13

| | Upper layer | | | | Aliphatic acid carbon number | Amount of free aliphatic acid (mg/m$^2$) | Lower layer | | | |
|---|---|---|---|---|---|---|---|---|---|---|
| | Amount of water-soluble Na (ppm) | Amount of water-soluble alkaline earth (ppm) | Amount of Na soluble in hydrochloric acid (ppm) | Film thickness ($\mu$m) | | | Film thickness ($\mu$m) | Kind of powder | Amount of water-soluble Na (ppm) | Amount of Na soluble in hydrochloric acid (ppm) |
| Example 8-1 | 400 | Ca 28 | 800 | 0.30 | 12 | 0.2 | 2.0 | Magnetic A | 10 | 50 |
| Example 8-2 | 400 | Ba 10 | 600 | 0.50 | 24 | 0.1 | 0.2 | Magnetic A | 30 | 80 |

TABLE 13-continued

| | Upper layer | | | | Ali- phatic acid carbon number | Amount of free ali- phatic acid (mg/m²) | Lower layer | | | |
|---|---|---|---|---|---|---|---|---|---|---|
| | Amount of water- soluble Na (ppm) | Amount of water-solu- ble alkaline earth (ppm) | Amount of Na soluble in hydrochloric acid (ppm) | Film thick- ness (μm) | | | Film thick- ness (μm) | Kind of powder | Amount of water- soluble Na (ppm) | Amount of Na soluble in hydrochloric acid (ppm) |
| Example 8-3 | 400 | Ca 0 | 420 | 0.20 | 18 | 0.2 | 1.8 | Magnetic A | 15 | 25 |
| Example 8-4 | 200 | Ca 0 | 300 | 0.18 | 18 | 0.3 | 1.8 | Non-magnet- ic B | 66 | 88 |
| Example 8-5 | 380 | Ba 1 | 500 | 0.30 | 18 | 0.4 | 1.4 | Non-magnet- ic B | 14 | 25 |
| Example 8-6 | 600 | Sr 2 | 1000 | 0.20 | 18 | 0.5 | 1.5 | Non-magnet- ic B | 22 | 40 |
| Example 8-7 | 500 | Ca 12 | 900 | 2.00 | 18 | 0.2 | *** | **** | *** | *** |
| Comparative example 8-1 | 600 | Ca 10 | 800 | 0.30 | 18 | 8.3 | 1.8 | Non-magnet- ic B | 120 | 200 |
| Comparative example 8-2 | 400 | Ca 40 | 420 | 0.20 | 16 | 10.0 | 1.7 | Non-magnet- ic B | 140 | 180 |
| Comparative example 8-3 | 250 | Ba 1 | 450 | 0.40 | 22 | 15.0 | 1.6 | Non-magnet- ic C | 120 | 230 |
| Comparative example 8-4 | 100 | Ca 10 | 130 | 0.30 | 18 | 16.0 | 1.6 | Magnetic A | 150 | 250 |

A: Co-coated iron oxide (magnetic)
B: Needle iron oxide (non-magnetic)
C: Spherical iron oxide (non-magnetic)

TABLE 14

| | Reproduction output (9 MHz) (dB) | | Dropout (5 μs/−8 dB) (l/min) | | Head clogging at 40° C./20 % RH (time/pass) | |
|---|---|---|---|---|---|---|
| | Before storage | After storage | Before storage | After storage | Before storage | After storage |
| Example 8-1 | 1.3 | 1.2 | 13 | 15 | 1 | 0 |
| Example 8-2 | 0.9 | 0.8 | 9 | 10 | 0 | 0 |
| Example 8-3 | 2.3 | 2.4 | 5 | 4 | 0 | 0 |
| Example 8-4 | 3.6 | 3.3 | 8 | 8 | 0 | 0 |
| Example 8-5 | 3.1 | 3.2 | 6 | 10 | 1 | 0 |
| Example 8-6 | 2.8 | 2.3 | 8 | 3 | 0 | 1 |
| Example 8-7 | 1.8 | 1.5 | 4 | 8 | 0 | 1 |
| Comparative example 8-1 | 1.5 | −4.0 | 10 | 200 | 2 | 15 |
| Comparative example 8-2 | 0.0 | −3.5 | 5 | 190 | 5 | 13 |
| Comparative example 8-3 | 1.0 | −4.0 | 12 | 160 | 8 | 20 |
| Comparative examaple 8-4 | 1.0 | −3.5 | 25 | 400 | 2 | 45 |

TABLE 15

| | Upper layer | | | | | Ali- phatic acid carbon number | Amount of free aliphat- ic acid (mg/m²) | Lower layer | | | |
|---|---|---|---|---|---|---|---|---|---|---|---|
| | *1 | *2 (ppm) | | *3 (ppm) | | Film thick- ness (μm) | | Film thick- ness (μm) | Kind of powder | Amount of water- soluble Na (ppm) | Amount of Na soluble in hydrochloric acid (ppm) |
| | (ppm) | | | | | | | | | | |
| Example 9-1 | Y | 10 | Na | 200 | Na | 300 0.35 | 18 | 0.2 | 1.8 | Magnetic A | 10 | 15 |
| Example 9-2 | La | 15 | Na | 300 | Na | 50 0.50 | 18 | 0.6 | 2.0 | Non-magnet- ic B | 20 | 22 |
| Example 9-3 | Ce | 85 | Li | 400 | Li | 600 0.15 | 12 | 4.0 | 1.5 | Non-magnet- ic B | 30 | 35 |
| Example 9-4 | La | 5 | K | 350 | K | 440 0.18 | 24 | 0.2 | 1.2 | Non-magnet- ic B | 10 | 12 |
| Example 9-5 | Nd | 2 | Na | 300 | Na | 600 0.25 | 16 | 0.2 | 1.5 | Non-magnet- ic B | 13 | 16 |
| Example 9-6 | Mg | 10 | Rb | 600 | Rb | 900 0.20 | 14 | 8.0 | 1.6 | Non-magnet- ic B | 10 | 15 |
| Example 9-7 | Sr | 10 | Na | 600 | Na | 800 0.36 | 18 | 0.3 | 0.4 | Non-magnet- ic B | 5 | 10 |
| Example 9-8 | Ca | 13 | Na | 800 | Na | 1200 0.60 | 16 | 0.5 | 1.2 | Non-magnet- ic B | 2 | 10 |
| Example 9-9 | Ba | 15 | Na | 900 | Na | 1000 0.35 | 18 | 0.1 | 1.3 | Non-magnet- ic | 15 | 13 |

TABLE 15-continued

| | Upper layer | | | | | | Ali- phatic acid carbon number | Amount of free aliphat- ic acid (mg/m²) | Lower layer | | |
|---|---|---|---|---|---|---|---|---|---|---|---|
| | *1 (ppm) | | *2 (ppm) | | *3 (ppm) | Film thick- ness (μm) | | | Film thick- ness (μm) | Kind of powder | Amount of water- soluble Na (ppm) | Amount of Na soluble in hydrochloric acid (ppm) |
| | | | | | | | | | | ic B | | |
| Example 9-10 | Mn | 2 | Cs | 350 | Cs | 400 | 0.20 | 18 | 5.0 | 1.6 | Magnetic A | 10 | 20 |
| Example 9-11 | Co | 1 | Na | 600 | Na | 680 | 0.20 | 16 | 6.0 | 1.6 | Magnetic A | 1 | 3 |
| Example 9-12 | Ni | 3 | Na | 900 | Na | 1000 | 0.20 | 18 | 1.0 | 1.5 | Magnetic A | 2 | 6 |
| Example 9-13 | Tl | 1 | Na | 350 | Na | 900 | 0.20 | 16 | 0.2 | 1.4 | Magnetic A | 10 | 13 |
| Example 9-14 | Ca | 5 | Na | 460 | Na | 600 | 2.0 | 18 | 0.2 | *** | **** | *** | *** |
| Comparative example 9-1 | Ca | 20 | Na | 600 | Na | 900 | 0.30 | 18 | 12.0 | 2.0 | Non-magnet- ic B | 150 | 170 |
| Comparative example 9-2 | Ba | 50 | Na | 300 | Na | 500 | 0.25 | 16 | 13.0 | 2.0 | Non-magnet- ic C | 170 | 200 |
| Comparative example 9-3 | Sr | 150 | K | 150 | K | 180 | 0.20 | 16 | 9.0 | 1.5 | Non-magnet- ic B | 190 | 250 |

*1: Water-soluble amount of an element with an acid dissociation constant by a metal ion being 8 to less than 14
*2: Water-soluble amount of an element with an acid dissociation constant by a metal ion being 14 or more
*3: Amount soluble in hydrochloric acid of an element with an acid dissociation constant by a metal ion being 14 or more
A: Co-coated iron oxide (magnetic)
B: Needle iron oxide (non-magnetic)
C: Spherical iron oxide (non-magnetic)

TABLE 16

| | Reproduction output (9 MHz) (dB) | | Dropout (5 μs/−8 dB) (1/min) | | Head clogging at 0° C. (time/pass) | |
|---|---|---|---|---|---|---|
| | Before storage | After storage | Before storage | After storage | Before storage | After storage |
| Example 9-1 | 1.0 | 0.8 | 10 | 12 | 1 | 0 |
| Example 9-2 | 2.0 | 2.1 | 15 | 14 | 0 | 0 |
| Example 9-3 | 2.3 | 2.1 | 14 | 10 | 0 | 1 |
| Example 9-4 | 2.0 | 2.0 | 13 | 18 | 0 | 0 |
| Example 9-5 | 2.0 | 2.2 | 10 | 15 | 0 | 0 |
| Example 9-6 | 1.5 | 1.3 | 12 | 13 | 0 | 0 |
| Example 9-7 | 2.0 | 2.4 | 5 | 10 | 0 | 1 |
| Example 9-8 | 2.5 | 2.0 | 3 | 5 | 0 | 0 |
| Example 9-9 | 3.0 | 3.0 | 2 | 4 | 0 | 0 |
| Example 9-10 | 2.0 | 1.8 | 12 | 15 | 1 | 0 |
| Example 9-11 | 1.2 | 1.1 | 12 | 13 | 0 | 0 |
| Example 9-12 | 1.0 | 1.2 | 10 | 13 | 0 | 1 |
| Example 9-13 | 0.8 | 1.0 | 12 | 17 | 0 | 0 |
| Example 9-14 | 1.0 | 1.0 | 5 | 9 | 0 | 0 |
| Comparative example 9-1 | 1.5 | −5.0 | 5 | 560 | 1 | 45 |
| Comparative example 9-2 | 0.0 | −4.0 | 10 | 450 | 9 | 30 |
| Comparative example 9-3 | 0.5 | −5.5 | 3 | 600 | 5 | 28 |

TABLE 17-a

| | *Upper layer | Amount | | Lower layer | | |
|---|---|---|---|---|---|---|
| | Film thick- ness (μm) | Aliphat- ic acid carbon number | of free aliphat- ic acid (mg/m²) | Film thick- ness (μm) | Kind of powder | Amount of water- soluble Na (ppm) | Amount of Na soluble in hydrochloric acid (ppm) |
| Example 10-1 | 0.55 | 18 | 0.3 | 1.9 | Magnetic A | 100 | 130 |
| Example 10-2 | 0.30 | 18 | 0.2 | 1.5 | Non-magnetic B | 200 | 400 |
| Example 10-3 | 0.30 | 12 | 0.1 | 0.2 | Non-magnetic B | 300 | 600 |
| Example 10-4 | 0.30 | 24 | 0.2 | 1.0 | Non-magnetic B | 450 | 600 |
| Example 10-5 | 0.15 | 16 | 0.2 | 1.5 | Non-magnetic B | 250 | 500 |
| Comparative example 10-1 | 0.30 | 18 | 8.2 | 1.5 | Non-magnetic B | 400 | 800 |

TABLE 17-a-continued

|  | *Upper layer | | | Lower layer | | |
|---|---|---|---|---|---|---|
|  | Film thickness (μm) | Aliphatic acid carbon number | Amount of free aliphatic acid (mg/m²) | Film thickness (μm) | Kind of powder | Amount of water-soluble Na (ppm) | Amount of Na soluble in hydrochloric acid (ppm) |
| Comparative example 10-2 | 0.30 | 16 | 10.0 | 1.5 | Non-magnetic B | 200 | 300 |
| Comparative example 10-3 | 0.25 | 16 | 13.0 | 1.5 | Magnetic A | 80 | 190 |
| Comparative example 10-4 | 0.30 | 16 | 15.0 | 1.0 | Magnetic A | 125 | 160 |

A: Co-coated iron oxide (magnetic)
B: Needle iron oxide (non-magnetic)
C: Spherical iron oxide (non-magnetic)
*Magnetic powder is the same as used in the upper layer of Comparative example 1-4

TABLE 17-b

| | Reproduction output (9 MHz) (dB) | | Dropout (5 μs/–8 dB) (1/min) | | Head clogging at 45° C./85 % RH (time/pass) | |
|---|---|---|---|---|---|---|
| | Before storage | After storage | Before storage | After storage | Before storage | After storage |
| Example 10-1 | 1.2 | 1.1 | 9 | 12 | 1 | 0 |
| Example 10-2 | 2.8 | 2.4 | 13 | 11 | 0 | 0 |
| Example 10-3 | 3.2 | 2.9 | 5 | 8 | 0 | 0 |
| Example 10-4 | 3.0 | 3.1 | 12 | 13 | 0 | 0 |
| Example 10-5 | 2.0 | 2.1 | 28 | 30 | 0 | 1 |
| Comparative example 10-1 | 1.5 | –3.5 | 15 | 380 | 1 | 39 |
| Comparative example 10-2 | 0.5 | –5.5 | 20 | 360 | 2 | 35 |
| Comparative example 10-3 | 0.5 | –3.5 | 15 | 25 | 0 | 30 |
| Comparative example 10-4 | 0.0 | –3.0 | 11 | 190 | 1 | 18 |

Next, another embodiment of the present invention (an embodiment using titanium oxide) is described below.

The respective components of magnetic coatings for an upper layer and coatings for a lower layer having the following compositions were kneaded and dispersed by using a kneader and a sand mill, respectively, to prepare magnetic coatings for an upper layer and coatings for a lower layer.

<Magnetic coatings for upper layer>

The same coatings as in Examples 1-1 to 10-5 were used. Compositions of ferromagnetic metallic powders are shown in Tables 18-a, 19, 21-a, 22-a, 24, 26, 27 and 28.

<Coatings C for lower layer>

Coatings C for a lower layer were obtained in the same manner as in the above Coatings A for a lower layer except for using spherical α-$Fe_2O_3$ (average particle size: 35 nm, BET: 40 m²/g, pH: 6.5, with a surface treated with Si and Al compounds (Si content: 0.1% by weight, Al content: 0.3% by weight)) in place of Co-γ-$Fe_2O_3$ used in Coatings A for a lower layer.

<Coatings D for lower layer>

Coatings D for a lower layer were obtained in the same manner as in the above Coatings A for a lower layer except for using spherical $TiO_2$ (average particle size: 32 nm, BET: 40 m²/g, pH: 7.5, crystal system: rutile, with a surface treated with Si and Al compounds (Si content: 0.1% by weight, Al content: 0.3% by weight)) in place of Co-γ-$Fe_2O_3$ used in Coatings A for a lower layer.

<Coatings E for lower layer>

Coatings E for a lower layer were obtained in the same manner as in the above Coatings A for a lower layer except for using needle $TiO_2$ (longer axis diameter: 0.12 μm, axial ratio: 6, BET: 40 m²/g, pH: 7.0, crystallite size: 220 Å, with a surface treated with Si and Al compounds (Si content: 0.1% by weight, Al content: 0.4% by weight)) in place of Co-γ-$Fe_2O_3$ used in Coatings A for a lower layer.

Examples 1-12 to 10-8

After the above magnetic coatings for an upper layer and coatings for a lower layer each containing ferromagnetic metallic powder shown in the respective tables were coated on a polyethylene terephthalate film having a thickness of 10 μm according to the wet-on-wet method, respectively, magnetic orientation treatment was carried out while coated films were not dried. Subsequently, the coated films were dried and subjected to surface-smoothing treatment by using a calender to prepare magnetic layers each comprising a lower layer and an upper layer having thicknesses shown in the respective tables.

Further, on each other surface (back surface) opposite to a side on which the magnetic layer was formed of the above polyethylene terephthalate film, a coating having the above composition was coated. A coated film was dried and then subjected to calendering under the above calendering conditions to form a back coat layer having a thickness of 0.8 μm, whereby a wide raw magnetic tape was obtained.

The raw magnetic tapes thus obtained were slitted and evaluated in the same manner as in Examples 1-1 to 10-5. The results are shown below.

TABLE 18-a

| | Upper layer | | | | | | | Lower layer | | | |
|---|---|---|---|---|---|---|---|---|---|---|---|
| | Surface composition of ferromagnetic metallic powder in medium (atom number of each element based on 100 Fe atoms) | | | | Film thickness (μm) | Aliphatic acid carbon number | Film thickness (μm) | Kind of powder | Amount of water-soluble Na (ppm) | Amount of Na soluble in hydrochloric acid (ppm) |
| | Na | Alkaline earth | | Rare earth | | | | | | | |
| Example 1-12 | 0.2 Ca | 5 Ba | 10 Sr | 10 Nd | 15 | 0.20 | 18 | 1.3 | Non-magnetic D | 4 | 8 |
| Example 1-13 | 0.2 Ca | 5 Ba | 10 Sr | 10 Nd | 15 | 0.20 | 18 | 1.4 | Non-magnetic E | 6 | 10 |
| Example 1-14 | 0.2 Ca | 5 Ba | 10 Sr | 10 Nd | 15 | 0.20 | 18 | 1.5 | Non-magnetic C | 10 | 20 |

C: Spherical iron oxide (non-magnetic)
D: Spherical titanium oxide (non-magnetic)
E: Needle titanium oxide (non-magnetic)

TABLE 18-b

| | Reproduction output (9 MHz) (dB) | | Dropout (5 μs/−8 dB) (1/min) | | Head clogging at 23° C./60 % RH (time/pass) | |
|---|---|---|---|---|---|---|
| | Before storage | After storage | Before storage | After storage | Before storage | After storage |
| Example 1-12 | 0.2 | 2.4 | 6 | 8 | 0 | 0 |
| Example 1-13 | 2.3 | 2.2 | 10 | 8 | 0 | 0 |
| Example 1-14 | 2.0 | 2.0 | 8 | 13 | 0 | 0 |

TABLE 19

| | Upper layer | | | | | | | | | | |
|---|---|---|---|---|---|---|---|---|---|---|---|
| | Entire composition of ferromagnetic metallic powder (parts by weight of each element based on 100 parts by weight of Fe atoms) | | | | | Surface composition of ferromagnetic metallic powder (atom number of each element based on 100 Fe atoms) | | | | | Film thickness (μm) |
| | Al | Alkaline earth | | | Rare earth | Na | Al | Alkaline earth | | | Rare earth | Na | |
| Example 2-11 | 3 | Ca 0.2 | Ba 2.0 | Sr 1.0 | Nd 4 | 0.004 | 130 | Ca 5 | Ba 12 | Sr 10 | Nd 10 | 1.6 | 0.18 |
| Example 2-12 | 3 | Ca 0.2 | Ba 2.0 | Sr 1.0 | Nd 4 | 0.003 | 130 | Ca 5 | Ba 12 | Sr 10 | Nd 10 | 1.3 | 0.18 |
| Example 2-13 | 3 | Ca 0.2 | Ba 2.0 | Sr 1.0 | Nd 4 | 0.003 | 130 | Ca 5 | Ba 12 | Sr 10 | Nd 10 | 1.3 | 0.18 |

TABLE 20

| | Lower layer | | | | | Reproduction output (9 MHz) (dB) | | Dropout (5 μs/−8 dB) (1/min) | | Head clogging at 40° C./80 % RH (time/pass) | |
|---|---|---|---|---|---|---|---|---|---|---|---|
| | Aliphatic acid Carbon number | Film thickness (μm) | Kind of powder | Amount of water-soluble Na (ppm) | Amount of Na soluble in hydrochloric acid (ppm) | Before storage | After storage | Before storage | After storage | Before storage | After storage |
| Example 2-11 | 18 | 1.8 | Non-magnetic C | 20 | 25 | 2.0 | 2.1 | 10 | 12 | 0 | 0 |
| Example 2-12 | 18 | 1.8 | Non-magnetic D | 15 | 17 | 2.3 | 2.2 | 8 | 10 | 0 | 0 |
| Example 2-13 | 18 | 1.8 | Non-magnetic E | 10 | 12 | 2.2 | 2.1 | 6 | 6 | 0 | 0 |

C: Spherical iron oxide (non-magnetic)
D: Spherical titanium oxide (non-magnetic)
E: Needle titanium oxide (non-magnetic)

TABLE 21-a

| | Upper layer | | | | Lower layer | | | | |
|---|---|---|---|---|---|---|---|---|---|
| | Amount of water-soluble Na (ppm) | Amount of water-soluble alkaline earth (ppm) | Amount of Na soluble in hydrochloric acid (ppm) | Film thickness (μm) | Aliphatic acid Carbon number | Film thickness (μm) | Kind of powder | Amount of water-soluble Na (ppm) | Amount of Na soluble in hydrochloric acid (ppm) |
| Example 3-8 | 15 | Ca 0 | 30 | 0.18 | 18 | 1.8 | Non-magnetic C | 40 | 50 |
| Example 3-9 | 15 | Ca 0 | 30 | 0.18 | 18 | 1.8 | Non-magnetic D | 30 | 40 |
| Example 3-10 | 15 | Ca 0 | 30 | 0.18 | 18 | 1.8 | Non-magnetic E | 35 | 40 |

C: Spherical iron oxide (non-magnetic)
D: Spherical titanium oxide (non-magnetic)
E: Needle titanium oxide (non-magnetic)

TABLE 21-b

| | Reproduction output (9 MHz) (dB) | | Dropout (5 μs/−8 dB) (1/min) | | Head clogging at 40° C./20 % RH (time/pass) | |
|---|---|---|---|---|---|---|
| | Before storage | After storage | Before storage | After storage | Before storage | After storage |
| Example 3-8 | 2.8 | 2.7 | 10 | 12 | 0 | 0 |
| Example 3-9 | 3.3 | 3.2 | 8 | 10 | 0 | 0 |
| Example 3-10 | 3.1 | 3.1 | 7 | 9 | 0 | 0 |

TABLE 22-a

| | Upper layer | | | | | Lower layer | | | |
|---|---|---|---|---|---|---|---|---|---|
| | *1 (ppm) | *2 (ppm) | *3 (ppm) | Film thickness (μm) | Aliphatic acid Carbon number | Film thickness (μm) | Kind of powder | Amount of water-soluble Na (ppm) | Amount of Na soluble in hydrochloric acid (ppm) |
| Example 4-15 | Ba 15 | Na 50 | Na 60 | 0.25 | 18 | 1.3 | Non-magnetic C | 20 | 25 |
| Example 4-16 | Ba 15 | Na 50 | Na 60 | 0.25 | 18 | 1.3 | Non-magnetic D | 15 | 17 |
| Example 4-17 | Ba 15 | Na 50 | Na 60 | 0.25 | 18 | 1.3 | Non-magnetic E | 18 | 20 |

*1: Water-soluble amount of an element with an acid dissociation constant by a metal ion being 8 to less than 14
*2: Water-soluble amount of an element with an acid dissociation constant by a metal ion being 14 or more
*3: Amount soluble in hydrochloric acid of an element with an acid dissociation constant by a metal ion being 14 or more
C: Spherical iron oxide (non-magnetic)
D: Spherical titanium oxide (non-magnetic)
E: Needle titanium oxide (non-magnetic)

TABLE 22-b

| | Reproduction output (9 MHz) (dB) | | Dropout (5 μs/−8 dB) (1/min) | | Head clogging at 0° C. (time/pass) | |
|---|---|---|---|---|---|---|
| | Before storage | After storage | Before storage | After storage | Before storage | After storage |
| Example 4-15 | 2.3 | 2.2 | 10 | 13 | 0 | 0 |
| Example 4-16 | 2.7 | 2.6 | 8 | 9 | 0 | 0 |
| Example 4-17 | 2.4 | 2.5 | 7 | 6 | 0 | 0 |

TABLE 23

| | *Upper layer | | Lower layer | | | | Reproduction output (9 MHz) (dB) | | Dropout (5 μs/−8 dB) (l/min) | | Head clogging at 45° C./85 % RH (time/pass) | |
|---|---|---|---|---|---|---|---|---|---|---|---|---|
| | Film thickness (μm) | Aliphatic acid Carbon number | Film thickness (μm) | Kind of powder | Amount of water-soluble Na (ppm) | Amount of Na soluble in hydrochloric acid (ppm) | Before storage | After storage | Before storage | After storage | Before storage | After storage |
| Example 5-6 | 0.30 | 18 | 1.0 | Non-magnetic C | 25 | 27 | 2.2 | 2.1 | 20 | 30 | 0 | 0 |
| Example 5-7 | 0.30 | 18 | 1.0 | Non-magnetic D | 20 | 22 | 2.6 | 2.5 | 15 | 17 | 0 | 0 |
| Example 5-8 | 0.30 | 18 | 1.0 | Non-magnetic E | 23 | 25 | 2.4 | 2.4 | 18 | 19 | 0 | 0 |

C: Spherical iron oxide (non-magnetic)
D: Spherical titanium oxide (non-magnetic)
E: Needle titanium oxide (non-magnetic)
*Magnetic powder is the same as used in the upper layer of Comparative example 1-4

TABLE 24

| | Upper layer | | | | | | | | Lower layer | | |
|---|---|---|---|---|---|---|---|---|---|---|---|
| | Surface composition of ferromagnetic metallic powder in medium (atom number of each element based on 100 Fe atoms) | | | | | Film thickness (μm) | Aliphatic acid carbon number | Amount of free aliphatic acid (mg/m²) | Film thickness (μm) | Kind of powder | Amount of water-soluble Na (ppm) | Amount of Na soluble in hydrochloric acid (ppm) |
| | Na | Alkaline earth | | | Rare earth | | | | | | | |
| Example 6-8 | 4 | Ca 5 | Ba 15 | Sr 15 | Nd 10 | 0.30 | 18 | 0.1 | 1.3 | Non-magnetic C | 130 | 160 |
| Example 6-9 | 4 | Ca 5 | Ba 15 | Sr 15 | Nd 10 | 0.30 | 18 | 0.3 | 1.3 | Non-magnetic D | 200 | 240 |
| Example 6-10 | 4 | Ca 5 | Ba 15 | Sr 15 | Nd 10 | 0.30 | 18 | 0.3 | 1.3 | Non-magnetic E | 250 | 270 |

C: Spherical iron oxide (non-magnetic)
D: Spherical titanium oxide (non-magnetic)
E: Needle titaniuim oxide (non-magnetic)

TABLE 25

| | Reproduction output (9 MHz) (dB) | | Dropout (5 μs/−8 dB) (l/min) | | Head clogging at 23° C./60 % RH (time/pass) | |
|---|---|---|---|---|---|---|
| | Before storage | After storage | Before storage | After storage | Before storage | After storage |
| Example 6-8 | 2.8 | 2.7 | 8 | 9 | 0 | 0 |
| Example 6-9 | 3.3 | 3.3 | 6 | 7 | 0 | 0 |
| Example 6-10 | 3.1 | 3.2 | 6 | 8 | 0 | 0 |

TABLE 26

| | Entire composition of ferromagnetic metallic powder (parts by weight of each element based on 100 parts by weight of Fe atoms) | | | | | Surface composition of ferromagnetic metallic powder (atom number of each element based on 100 Fe atoms) | | | | | Film thickness (μm) |
|---|---|---|---|---|---|---|---|---|---|---|---|
| | Al | Alkaline earth | | Rare earth | Na | Al | Alkaline earth | | Rare earth | Na | |
| Example 7-11 | 3 | Ca 0.2 | Ba 2.0 Sr 1.0 | Nd 4 | 0.004 | 130 | Ca 5 | Ba 12 Sr 10 | Nd 10 | 8.0 | 0.18 |
| Example 7-12 | 3 | Ca 0.2 | Ba 2.0 Sr 1.0 | Nd 4 | 0.004 | 130 | Ca 5 | Ba 12 Sr 10 | Nd 10 | 8.0 | 0.18 |
| Example 7-13 | 3 | Ca 0.2 | Ba 2.0 Sr 1.0 | Nd 4 | 0.004 | 130 | Ca 5 | Ba 12 Sr 10 | Nd 10 | 8.0 | 0.18 |

TABLE 27

| | Aliphatic acid carbon number | Amount of free aliphatic acid (mg/m²) | Film thickness (μm) | Lower layer | | | Reproduction output (9 MHz) (dB) | | Dropout (5 μs/−8 dB) (l/min) | | Head clogging at 40° C./80 % RH (time/pass) | |
|---|---|---|---|---|---|---|---|---|---|---|---|---|
| | | | | Kind of powder | Amount of water-soluble Na (ppm) | Amount of Na soluble in hydrochloric acid (ppm) | Before storage | After storage | Before storage | After storage | Before storage | After storage |
| Example 7-11 | 18 | 0.3 | 1.8 | Non-magnetic C | 200 | 240 | 2.6 | 2.6 | 10 | 12 | 0 | 0 |
| Example 7-12 | 18 | 0.2 | 1.8 | Non-magnetic D | 180 | 210 | 3.1 | 3.0 | 8 | 6 | 0 | 0 |
| Exmaple 7-13 | 18 | 0.3 | 1.8 | Non-magnetic E | 170 | 200 | 2.9 | 2.8 | 10 | 9 | 0 | 0 |

C: Spherical iron oxide (non-magnetic)
D: Spherical titanium oxide (non-magnetic)
E: Needle titanium oxide (non-magnetic)

TABLE 28

| | Upper layer | | | | | | | Lower layer | | |
|---|---|---|---|---|---|---|---|---|---|---|
| | Amount of water-soluble Na (ppm) | Amount of water-soluble alkaline earth (ppm) | Amount of Na soluble in hydrochloric acid (ppm) | Film thickness (μm) | Aliphatic acid carbon number | Amount of free aliphatic acid (mg/m²) | Film thickness (μm) | Kind of powder | Amount of water-soluble Na (ppm) | Amount of Na soluble in hydrochloric acid (ppm) |
| Example 8-8 | 200 | Ca 0 | 300 | 0.18 | 18 | 0.5 | 1.8 | Non-magnetic C | 130 | 200 |
| Example 8-9 | 200 | Ca 0 | 300 | 0.18 | 18 | 0.3 | 1.8 | Non-magnetic D | 160 | 220 |
| Example 8-10 | 200 | Ca 0 | 300 | 0.18 | 18 | 0.4 | 1.8 | Non-magnetic E | 150 | 200 |

C: Spherical iron oxide (non-magnetic)
D: Spherical titanium oxide (non-magnetic)
E: Needle titanium oxide (non-magnetic)

TABLE 29

| | Reproduction output (9 MHz) (dB) | | Dropout (5 μs/−8 dB) (l/min) | | Head clogging at 40° C./20 % RH (time/pass) | |
|---|---|---|---|---|---|---|
| | Before storage | After storage | Before storage | After storage | Before storage | After storage |
| Example 8-8 | 3.0 | 3.0 | 8 | 10 | 0 | 0 |
| Example 8-9 | 3.4 | 3.2 | 7 | 9 | 0 | 0 |
| Example 8-10 | 3.2 | 3.1 | 6 | 8 | 0 | 0 |

TABLE 30

| | Upper layer | | | | Ali-phatic acid Carbon number | Amount of free aliphat-ic acid (mg/m$^2$) | Lower layer | | | |
|---|---|---|---|---|---|---|---|---|---|---|
| | *1 (ppm) | *2 (ppm) | *3 (ppm) | Film thick-ness (μm) | | | Film thick-ness (μm) | Kind of powder | Amount of water-soluble Na (ppm) | Amount of Na soluble in hydrochloric acid (ppm) |
| Example 9-15 | 15 | Na 900 | Na 1000 | 0.35 | 18 | 0.2 | 1.4 | Non-magnet-ic C | 140 | 200 |
| Example 9-16 | Ba 15 | Na 900 | Na 1000 | 0.30 | 18 | 0.1 | 1.4 | Non-magnet-ic D | 130 | 220 |
| Example 9-17 | Ba 15 | Na 900 | Na 1000 | 0.30 | 18 | 0.1 | 1.5 | Non-magnet-ic E | 150 | 240 |

*1: Water-soluble amount of an element with an acid dissociation constant by a metal ion being 8 to less than 14
*2: Water-soluble amount of an element with an acid dissociation constant by a metal ion being 14 or more
*3: Amount soluble in hydrochloric acid of an element with an acid dissociaton constant by a metal ion being 14 or more
C: Spherical iron oxide (non-magnetic)
D: Spherical titanium oxide (non-magnetic)
E: Needle titanium oxide (non-magnetic)

TABLE 31

| | Reproduction output (9 MHz) (dB) | | Dropout (5 μs/−8 dB) (l/min) | | Head clogging at 0° C. (time/pass) | |
|---|---|---|---|---|---|---|
| | Before storage | After storage | Before storage | After storage | Before storage | After storage |
| Example 9-15 | 2.4 | 2.5 | 10 | 11 | 0 | 0 |
| Example 9-16 | 2.8 | 2.9 | 9 | 10 | 0 | 0 |
| Example 9-17 | 2.6 | 2.6 | 8 | 8 | 0 | 0 |

TABLE 32-a

| | Upper layer | | Amount | Lower layer | | | |
|---|---|---|---|---|---|---|---|
| | Film thick-ness (μm) | Aliphat-ic acid Carbon number | of free aliphat-ic acid (mg/m$^2$) | Film thick-ness (μm) | Kind of powder | Amount of water-soluble Na (ppm) | Amount of Na soluble in hydrochloric acid (ppm) |
| Example 10-6 | 0.30 | 18 | 0.2 | 1.6 | Non-magnetic C | 300 | 320 |
| Example 10-7 | 0.30 | 18 | 0.3 | 1.5 | Non-magnetic D | 250 | 300 |
| Example 10-8 | 0.30 | 18 | 0.4 | 1.5 | Non-magnetic E | 270 | 300 |

C: Spherical iron oxide (non-magnetic)
D: Spherical titanium oxide (non-magnetic)
E: Needle titanium oxide (non-magnetic)
*Magnetic powder is the same as used in the upper layer of Comparative example 1-4

TABLE 32-b

| | Reproduction output (9 MHz) (dB) | | Dropout (5 μs/−8 dB) (1/min) | | Head clogging at 45° C./85 % RH (time/pass) | |
|---|---|---|---|---|---|---|
| | Before storage | After storage | Before storage | After storage | Before storage | After storage |
| Example 10-6 | 2.4 | 2.2 | 18 | 20 | 0 | 0 |
| Example 10-7 | 2.6 | 2.3 | 8 | 10 | 0 | 0 |
| Example 10-8 | 2.5 | 2.4 | 11 | 12 | 0 | 0 |

As can be clearly seen from the result shown in the above tables, it can be seen that the magnetic recording media of the present invention are excellent.

Even when the magnetic recording medium of the present invention is stored under high temperature and high humidity for a long period of time, increase in dropout, lowering of reproduction output and head clogging are not caused, whereby high electromagnetic exchange characteristics obtained before storage can be maintained.

We claim:

1. A magnetic recording medium comprising a non-magnetic support and a magnetic layer thereon, said magnetic layer containing a binder, a ferromagnetic metallic powder, and an aliphatic acid having 12 to 24 carbons, atomic ratios of elements forming a surface of said ferromagnetic powder subjected to orientation are, per 100 of iron, less than 1 of sodium, not more than 40 of alkaline earth, and 1 to 50 of rare earth.

2. The medium of claim 1 wherein said alkaline earth is selected from the group consisting of magnesium, calcium, strontium, barium, radium, and mixtures thereof; and said rare earth element is selected from the group consisting of samarium, neodymium, yttrium, lanthanum, promethium, and mixtures thereof.

3. The medium of claim 1 which comprises a lower layer between said non-magnetic support and said magnetic layer, a dry film thickness of said magnetic layer being 0.02 to 1.0 μm.

4. The medium of claim 3 whrein said dry film thickness of said magnetic layer is 0.1 to 0.6 μm.

5. The medium of claim 3 wherein a dry film thickness of said lower layer is 0.2 to 2.0 μm.

6. The medium of claim 5 wherein the dry film thickness of said lower layer is 0.3 to 1.5 μm.

7. The medium of claim 1 comprising a lower layer between said non-magnetic support and said magnetic layer, and wherein magnetic powder or non-magnetic powder contained in said lower layer releases less than 130 ppm of a sodium ion, said magnetic powder or said non-magnetic powder is dipped in water and boiled for 5 minutes.

8. The medium of claim 1 comprising a lower layer between said non-magnetic support and said magnetic layer, wherein magnetic powder or non-magnetic powder in said lower layer has a needle shape.

9. The medium of claim 1 wherein said medium comprises a lower layer between said non-magnetic support and said magnetic layer, and said aliphatic acid is in said lower layer.

10. The medium of claim 8 wherein said non-magnetic powder is selected from the group consisting of an azo type organic dye pigment, carbon black, graphite, $TiO_2$, barium sulfate, ZnS, $MgCO_3$, $CaCO_3$, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, artificial diamond, $\alpha$-iron oxide, garnet, quartz rock, silicon nitride, silicon carbide, molybdenum carbide, boron carbide, tungsten carbide, titanium carbide, tripoli, diatomaceous earth, and dolomite.

11. The medium of claim 10 wherein said non-magnetic powder is selected from the group consisting of $\alpha$-$Fe_2O_3$, carbon black, and $TiO_2$.

12. A magnetic recording medium comprising a non-magnetic support and a magnetic layer thereon, said magnetic layer containing a binder, a ferromagnetic metallic powder, and an aliphatic acid having 12 to 24 carbon atoms, wherein said ferromagnetic powder, based on 100 parts by weight of iron, comprises 2 to 10 parts by weight of aluminum, 1 to 8 parts by weight of rare earth, 0.1 to 5 parts by weight of alkaline earth, and less than 0.01 parts by weight of sodium, said ferromagnetic powder, per 100 atoms of iron, comprising 70 to 300 aluminum atoms, 0.5 to 60 rare earth atoms, not more than 40 alkaline earth atoms, and less than 4 sodium atoms.

* * * * *